United States Patent
Chu et al.

(10) Patent No.: US 12,144,063 B2
(45) Date of Patent: Nov. 12, 2024

(54) WLAN OPERATION USING MULTIPLE COMPONENT CHANNELS

(71) Applicant: Marvell Asia Pte Ltd., Singapore (SG)

(72) Inventors: Liwen Chu, San Ramon, CA (US);
Hongyuan Zhang, Fremont, CA (US);
Hui-Ling Lou, Sunnyvale, CA (US);
Yi-Ling Chao, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 16/585,930

(22) Filed: Sep. 27, 2019

(65) Prior Publication Data
US 2020/0107393 A1    Apr. 2, 2020

Related U.S. Application Data

(60) Provisional application No. 62/821,313, filed on Mar. 20, 2019, provisional application No. 62/738,489, filed on Sep. 28, 2018.

(51) Int. Cl.
*H04W 80/02*    (2009.01)
*H04L 1/00*    (2006.01)
(Continued)

(52) U.S. Cl.
CPC ........... *H04W 80/02* (2013.01); *H04L 1/0003* (2013.01); *H04L 1/1621* (2013.01); *H04W 72/0453* (2013.01); *H04W 84/12* (2013.01)

(58) Field of Classification Search
CPC ............. H04W 84/12; H04W 52/0216; H04W 72/0453; H04W 80/02; H04W 74/0808;
(Continued)

(56) References Cited

U.S. PATENT DOCUMENTS 8,773,969 B1    7/2014    Zhang et al.
8,787,385 B2    7/2014    Liu et al.
(Continued)

FOREIGN PATENT DOCUMENTS

EP    2028809 A2    2/2009
EP    2999252 A1    3/2016
(Continued)

OTHER PUBLICATIONS

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).
(Continued)

*Primary Examiner* — Jianye Wu

(57) ABSTRACT

A method for operation of a first communication device in a wireless local area network (WLAN) communication channel, having a plurality of component channels, between the first communication device and a second communication device is described. A first physical layer (PHY) protocol data unit (PPDU) and a second PPDU, distinct from the first PPDU, are generated. The first PPDU and second PPDU are transmitted simultaneously to the second communication device over the WLAN communication channel, including: transmitting the first PPDU via a first component channel within a first radio frequency (RF) channel segment that occupies a first frequency bandwidth, and transmitting the second PPDU via a second component channel within a second RF channel segment that occupies a second frequency bandwidth that does not overlap the first frequency
(Continued)

bandwidth segment, and is separated from the first frequency bandwidth segment by a frequency gap.

28 Claims, 8 Drawing Sheets

(51) Int. Cl.
  *H04L 1/1607* (2023.01)
  *H04W 72/0453* (2023.01)
  *H04W 84/12* (2009.01)

(58) Field of Classification Search
  CPC ........ H04W 76/15; H04L 1/1621; H04L 1/18; H04L 1/0003; H04L 5/0044; H04L 5/0041; H04L 5/001; H04L 5/0042; Y02D 30/70
  See application file for complete search history.

(56) References Cited

U.S. PATENT DOCUMENTS

| | | | |
|---|---|---|---|
| 9,876,614 B1* | 1/2018 | Sun | H04L 1/1685 |
| 10,257,806 B2 | 4/2019 | Chu et al. | |
| 10,349,413 B2 | 7/2019 | Zhang et al. | |
| 2004/0240426 A1 | 12/2004 | Wu et al. | |
| 2004/0264561 A1 | 12/2004 | Alexander et al. | |
| 2006/0029099 A1 | 2/2006 | Jang | |
| 2010/0208712 A1* | 8/2010 | Wax | H04B 17/345 370/338 |
| 2011/0249659 A1 | 10/2011 | Fontaine et al. | |
| 2015/0098541 A1 | 4/2015 | Ben-bassat | |
| 2015/0146653 A1* | 5/2015 | Zhang | H04L 5/0041 370/329 |
| 2015/0271002 A1* | 9/2015 | Oh | H04L 27/2602 370/329 |
| 2016/0057657 A1 | 2/2016 | Seok | |
| 2016/0157261 A1* | 6/2016 | Xiang | H04W 74/04 370/329 |
| 2016/0212748 A1 | 7/2016 | Yang et al. | |
| 2016/0241315 A1 | 8/2016 | Kwon | |
| 2016/0249381 A1* | 8/2016 | Choi | H04W 74/004 |
| 2016/0302200 A1* | 10/2016 | Yang | H04L 5/001 |
| 2016/0323820 A1* | 11/2016 | Wong | H04W 40/005 |
| 2017/0048048 A1* | 2/2017 | Seok | H04L 1/1621 |
| 2017/0111853 A1* | 4/2017 | Hegde | H04W 48/16 |
| 2017/0149547 A1 | 5/2017 | Kim et al. | |
| 2017/0181136 A1 | 6/2017 | Bharadwaj et al. | |
| 2017/0188336 A1 | 6/2017 | Ahn et al. | |
| 2017/0289933 A1 | 10/2017 | Segev et al. | |
| 2017/0295571 A1 | 10/2017 | Chu et al. | |
| 2017/0311204 A1* | 10/2017 | Cariou | H04W 28/085 |
| 2017/0311260 A1 | 10/2017 | Trainin et al. | |
| 2017/0325178 A1 | 11/2017 | Verma et al. | |
| 2017/0366329 A1 | 12/2017 | Cao et al. | |
| 2018/0115403 A1 | 4/2018 | Sakai et al. | |
| 2018/0160429 A1* | 6/2018 | Seok | H04L 1/0045 |
| 2018/0205441 A1* | 7/2018 | Asterjadhi | H04W 74/06 |
| 2018/0206284 A1 | 7/2018 | Zhou et al. | |
| 2018/0288799 A1 | 10/2018 | Min et al. | |
| 2018/0302858 A1 | 10/2018 | Son et al. | |
| 2019/0090278 A1 | 3/2019 | Chu et al. | |
| 2019/0123863 A1 | 4/2019 | Zhang et al. | |
| 2019/0124652 A1 | 4/2019 | Kim et al. | |
| 2019/0182714 A1 | 6/2019 | Chu et al. | |
| 2019/0182863 A1 | 6/2019 | Chu et al. | |
| 2019/0190752 A1 | 6/2019 | Chen et al. | |
| 2019/0238259 A1* | 8/2019 | Huang | H04W 40/244 |
| 2019/0349930 A1 | 11/2019 | Chu et al. | |
| 2020/0037324 A1 | 1/2020 | Chu et al. | |
| 2020/0304266 A1 | 9/2020 | Chu et al. | |
| 2020/0404680 A1 | 12/2020 | Chu et al. | |

FOREIGN PATENT DOCUMENTS

| | | | |
|---|---|---|---|
| GB | 2501898 A | 11/2013 | |
| WO | WO-2006/000955 A1 | 1/2006 | |
| WO | WO-2012/026779 A2 | 3/2012 | |
| WO | WO-2015/099803 A1 | 7/2015 | |
| WO | WO-2017/026937 A1 | 2/2017 | |
| WO | WO-2017/111567 A2 | 6/2017 | |

OTHER PUBLICATIONS

U.S. Appl. No. 16/847,326, Chu et al., "Allocating Resource Units for Uplink Multi-User Transmissions in Wide Bandwidths," filed Apr. 13, 2020.

U.S. Appl. No. 16/907,099, Chu et al., "Padding and Backoff Operations When Transmitting Via Multiple Frequency Segments in a WLAN," filed Jun. 19, 2020.

Zhang et al., "EHT Technology Candidate Discussions," IEEE draft doc IEEE 802.11-18/1161r0, 10 pages (Jul. 8, 2018).

Invitation to Pay Additional Fees and Partial International Search Report in International Patent Application No. PCT/US2019/053556, mailed Dec. 20, 2019 (13 pages).

International Search Report and Written Opinion in International Patent Application No. PCT/US2019/053556, dated Feb. 12, 2020 (17 pages).

Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency Wlan," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

U.S. Appl. No. 16/406,898, Chu et al., "Wifi Backoff Timer," filed May 8, 2019.

Seok et al., "Enhanced Multi-band/Multi-channel Operation," IEEE draft doc. IEEE 802.11-19/076641, vol. 802.11 EHT; 802.11be, No. 1; 13 pages (May 14, 2019).

Seok et al., "EHT Multi-link Operation," IEEE draft doc. IEEE 802.11-19/0731r0, vol. 802.11 EHT; 802.11be; 17 pages (May 15, 2019).

Choi et al., "View on EHT Objectives and Technologies," IEEE draft doc. IEEE 802.11-18/1171r0, 13 pages (Jul. 8, 2018).

Chu et al., "Multiple Band Operation Discussion," IEEE draft doc. IEEE 802.11-19/0821r0, vol. 802.11 EHT; 802.11be; 7 pages (May 14, 2019).

IEEE Std P802.11-REVmcTM/D8.0, (Revision of IEEE Std 802.11TM-2012), "Draft Standard for Information Technology—Telecommunications and information exchange between systems—Local and metropolitan area networks—Specific requirements," Part 11: Wireless LAN Medium Access Control (MAC) and Physi-

(56) References Cited

OTHER PUBLICATIONS cal Layer (PHY) Specifications, The Institute of Electrical and Electronics Engineers, Inc., 3774 pages (Aug. 2016).
Von Mulert, et al., "Security threats and solutions in MANETs: A case study using AODV and Saodv," J. of Network and Computer Applications, vol. 35, pp. 1249-1259, Feb. 17, 2012.
Notification of Divisional Application for Chinese Patent Application No. 201980076250.4, dated Dec. 17, 2023. (2 pages).
First Office Action for Chinese Application No. 201980076250.4, mailed Jun. 29, 2024. (10 pages).
Search Report for Chinese Application No. 201980076250.4, mailed Jun. 29, 2024. (3 pages).

* cited by examiner

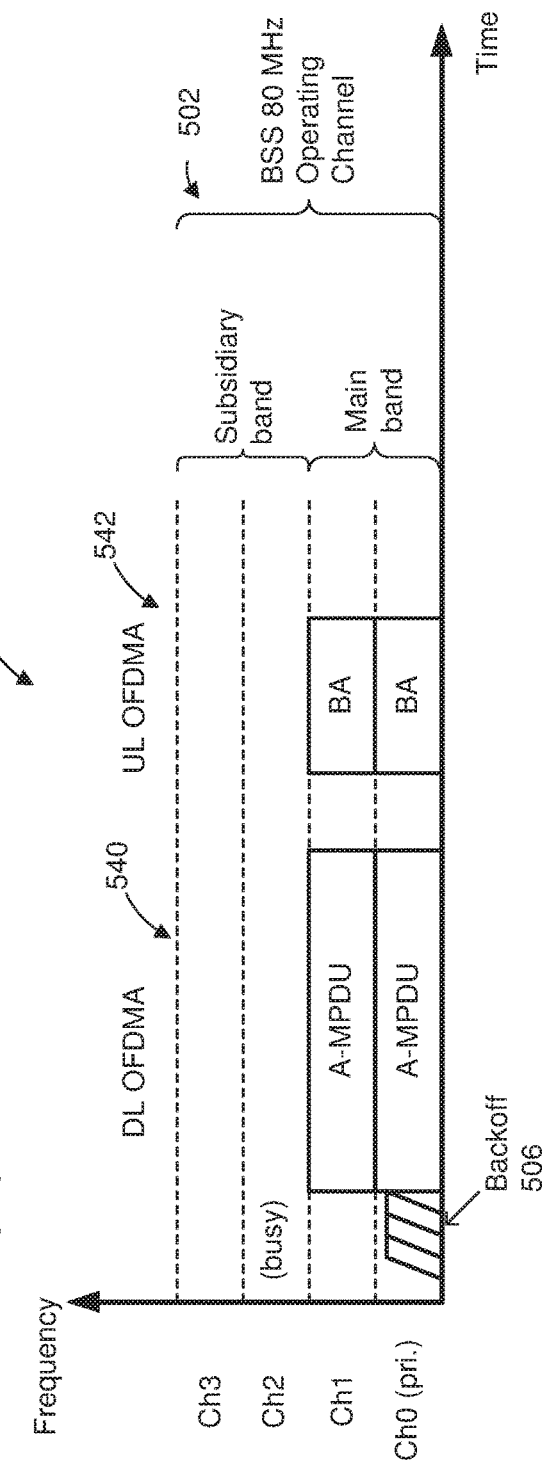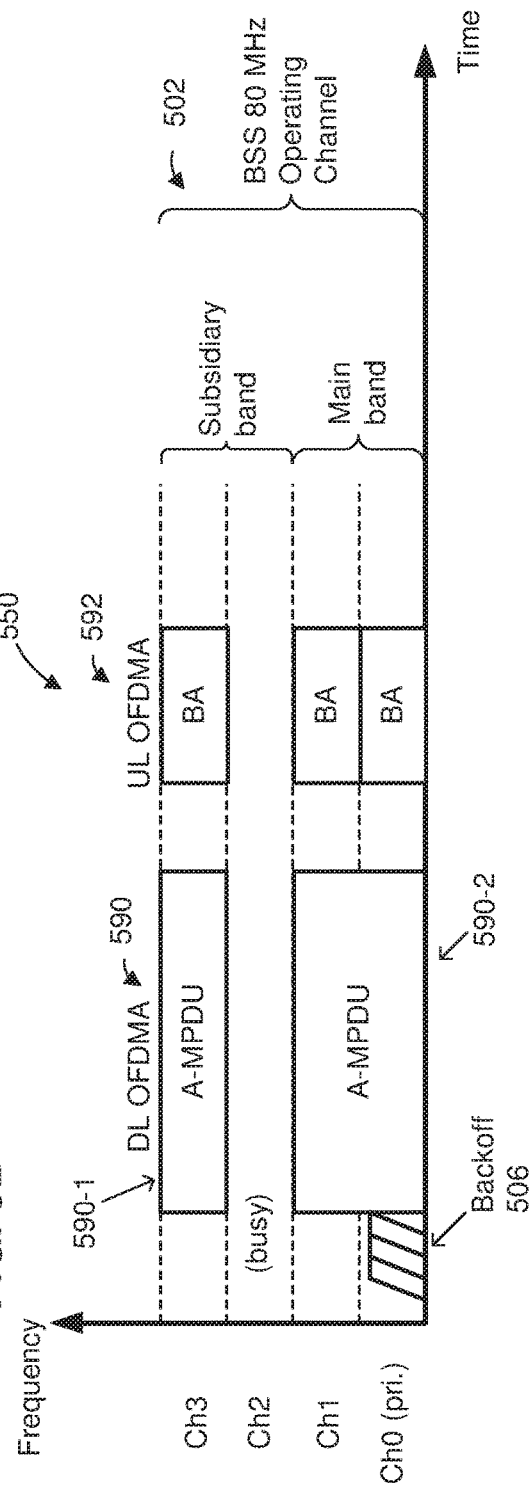

WLAN OPERATION USING MULTIPLE COMPONENT CHANNELS

CROSS REFERENCES TO RELATED APPLICATIONS

This application claims the benefit of U.S. Provisional Patent Application No. 62/738,489, entitled "Frame Exchange, Basic Service Set (BSS) Operation and Operating Mode with Band Aggregation," filed on Sep. 28, 2018, and U.S. Provisional Patent Application No. 62/821,313, entitled "Frame Exchange, Basic Service Set (BSS) Operation and Operating Mode with Band Aggregation," filed on Mar. 20, 2019, which is hereby incorporated herein by reference in its entirety.

FIELD OF TECHNOLOGY

The present disclosure relates generally to wireless communication systems, and more particularly to physical layer (PHY) support for data transmission and reception over multiple communication channels.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range. Although IEEE 802.11 compatible communication devices generally utilize 2.4 GHz or 5 GHz bands, as additional bands are made available for WLAN communication (e.g., the 6 GHz band), improved throughput is provided by communication devices that are configured to utilize multiple bands concurrently. In some scenarios, enabling access to multiple bands by multiple devices creates challenges of maintaining fairness to legacy devices that support only a single band, providing indications of supported bands to other devices, and determining which bands should be utilized when communicating with another device.

SUMMARY

In an embodiment, a method for operation of a first communication device in a wireless local area network (WLAN) communication channel between the first communication device and a second communication device includes, where the WLAN communication channel has a plurality of component channels: generating, at the first communication device, a first physical layer (PHY) protocol data unit (PPDU) for transmission to the second communication device; generating, at the first communication device, a second PPDU that is distinct from the first PPDU for transmission to the second communication device; transmitting, by the first communication device, the first PPDU simultaneously with the second PPDU to the second communication device over the WLAN communication channel, the transmitting including: transmitting the first PPDU via a first component channel of the plurality of component channels, the first component channel being within a first radio frequency (RF) channel segment that occupies a first frequency bandwidth, and transmitting the second PPDU via a second component channel of the plurality of component channels, the second component channel being within a second RF channel segment that occupies a second frequency bandwidth that does not overlap the first frequency bandwidth segment, and is separated from the first frequency bandwidth segment by a frequency gap.

In another embodiment, a method for operation of a first communication device in a wireless local area network (WLAN) communication channel between the first communication device and a second communication device includes, where the WLAN communication channel has a plurality of component channels: associating, by the first communication device, a first physical layer (PHY) processor of the first communication device with the WLAN communication channel, the first PHY processor having a first transceiver configured for radio frequency (RF) communication in a first frequency bandwidth of the WLAN communication channel; associating, by the first communication device, a second PHY processor of the first communication device with the WLAN communication channel, the second PHY processor having a second transceiver configured for RF communication in a second frequency bandwidth of the WLAN communication channel, wherein the first frequency bandwidth and the second frequency bandwidth do not overlap and are separated by a frequency gap; and entering, by the first transceiver, a power save mode while the second transceiver is in an active mode.

BRIEF DESCRIPTION OF THE DRAWINGS

FIG. 5A and FIG. 5B are example timing diagrams for a WLAN communication device of FIG. 1 that is configured to use a plurality of component channels of a WLAN communication channel, in an embodiment;

DETAILED DESCRIPTION

Multi-channel communication techniques described below are discussed merely for explanatory purposes in the context of wireless local area networks (WLANs) that utilize protocols which are the same as or similar to protocols that are defined by the 802.11 Standard from the Institute of Electrical and Electronics Engineers (IEEE) merely for explanatory purposes. In other embodiments, however, multi-channel communication techniques are utilized in other types of suitable wireless communication systems.

In various embodiments, a WLAN communication channel includes a plurality of component channels that are arranged in one or more channel segments. In some embodiments, the channel segments are contiguous, while in other embodiments the channel segments are non-contiguous, in other words, separated by a frequency gap. In an embodiment, the channel segments are located in different bands, for example, 2.4 GHz, 5 GHz, and 6 GHz bands. In other embodiments, other suitable bands are utilized (e.g., 60 GHz, "sub-1 GHz" or 900 MHz, 3.6 GHz, 4.9 GHz, etc.). In various embodiments, the component channels occupy a 20 MHz bandwidth, 40 MHz bandwidth, 5 MHz bandwidth, or other suitable bandwidth within the corresponding band. In various embodiments, the channel segments include one or more component channels and have a total bandwidth of 20 MHz, 40 MHz, 80 MHz, 160 MHz, 320 MHz, or another suitable total bandwidth.

In various embodiments, a WLAN communication device, for example, an access point (AP), designates the component channels of the WLAN communication channel as "primary" channels or "secondary" channels. The AP utilizes primary channels for various operations, such as for transmission of various management transmissions (e.g., transmissions for association of a client station 154 with the AP 114, beacon transmissions by the AP 114, operating channel bandwidths switch announcement transmissions, etc.), for conducting clear channel assessment (CCA) procedures, etc. The AP utilizes the primary and/or secondary channels for packet transfers with other WLAN communication devices (e.g., transferring user data to client stations). In an embodiment, the AP generally reserves the primary channel(s) for management operations associated with the WLAN 110 and does not use the secondary channels for the management operations.

In an embodiment, the WLAN communication channel has only one component channel designated as a primary channel, with remaining component channels designated as secondary channels. In another embodiment, the WLAN communication channel has two or more primary channels, with remaining component channels designated as secondary channels. In some embodiments, at least some of the two or more primary channels are in different bands. For example, a first primary channel is located in the 5 GHz band and a second primary channel is located in the 6 GHz band.

Figure 1:
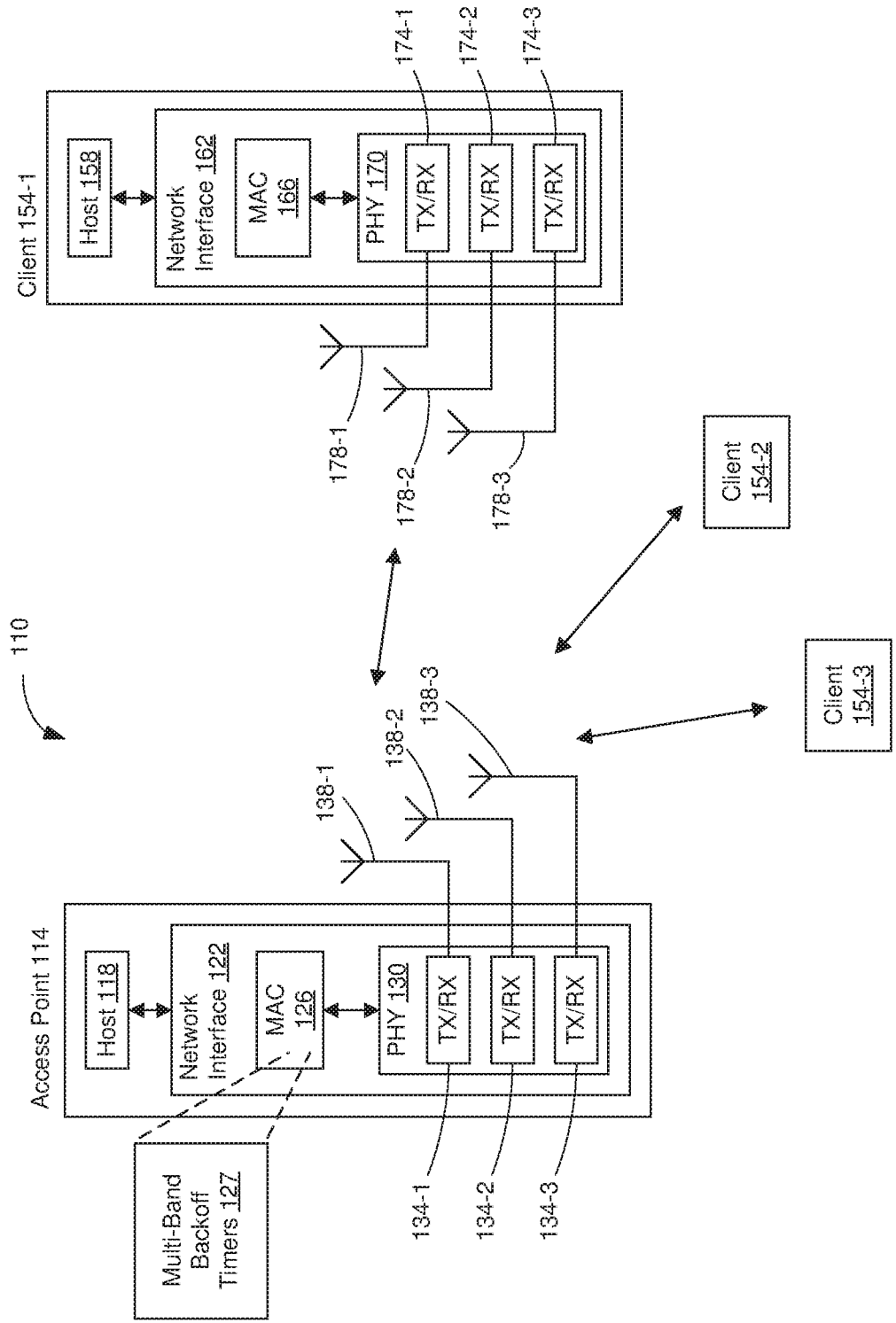
FIG. 1 is a block diagram of an example wireless local area network (WLAN) that supports a plurality of component channels arranged in one or more channel segments, according to an embodiment.

FIG. 1 is a block diagram of an example wireless local area network (WLAN) 110 that supports a plurality of component channels arranged in one or more channel segments, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 is implemented, at least partially, on a first IC, and the PHY processor 130 is implemented, at least partially, on a second IC, in various embodiments. As another example, at least a portion of the MAC processor 126 and at least a portion of the PHY processor 130 are implemented on a single IC. For instance, the network interface device 122 is implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 is implemented, at least partially, on a first IC, and the network interface device 122 is implemented, at least partially, on a second IC, in various embodiments. As another example, the host processor 118 and at least a portion of the network interface device 122 is implemented on a single IC.

The network interface device 122 is configured to generate and transmit different PHY protocol data units (PPDUs), simultaneously, utilizing different component channels of a WLAN communication channel, in various embodiments and/or scenarios. In an embodiment, for example, the network interface device 122 is configured to generate a first PPDU and a second PPDU and to transmit i) the first PPDU via a first component channel in a first radio frequency (RF) channel segment, and ii) the second PPDU via a second component channel in a second RF channel segment In some embodiments, the first and second RF channel segments do not overlap and are separated by a frequency gap.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. The PHY processor 130 is configured to receive MAC layer data units from the MAC processor 126 and encapsulate the MAC layer data units to generate PHY data units such as PHY protocol data units (PPDUs) for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets," and MAC layer data units are sometimes referred to herein as "frames."

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc., to provide at least some of the functionality described herein. In another embodiment, the MAC processor 126 includes a hardware state machine that provides at least some of the functionality described herein.

In various embodiments, the MAC processor 126 includes one or more multi-band backoff timers 127 configured to perform one or more backoff procedures in connection with multiple communication channels in multiple RF bands. The backoff procedure involves waiting a period of time before attempting to use a communication channel, according to an embodiment. In some embodiments and/or scenarios, the AP 114 utilizes different backoff timers for different primary channels that are within different bands of a WLAN communication channel. In some scenarios, the separate primary channels improve coexistence and sharing with legacy devices or single-band devices. In an embodiment, the multi-band backoff timers 127 include one or more network allocation vector (NAV) counters for monitoring use of multiple communication channels in multiple RF bands, according to an embodiment. For example, when the access point 114 receives a packet, the MAC processor 126 sets a NAV counter according to a value in a duration field in a MAC header of the packet, at least in some situations, according to an embodiment. The MAC processor 126 monitors the NAV counter to determine when the transmission of the packet has ended. Some packets are configured for reserving a channel for a desired time period and the duration field in the MAC header of the packet is set to the desired time period. When receiving such a packet, the MAC processor 126 sets a NAV counter according to the value in the duration field in a MAC header of the packet. The MAC processor 126 monitors the NAV counter to determine when the reservation of the channel has ended. In some embodiments, the MAC processor 126 includes i) one or more NAV counters, and ii) one or more NAV synchronization timers that allow for synchronization after a primary channel change in an operating channel, as described below.

In an embodiment, the MAC processor 126 and the PHY processor 130 are configured to operate according to a first WLAN communication protocol (e.g., an IEEE 802.11 be Standard, or extremely high throughput (EHT)), and also according to one or more second WLAN communication protocols (e.g., as defined by one or more of the IEEE 802.11n Standard, IEEE 802.1 lac Standard, the IEEE 802.1 lax Standard and/or other suitable WLAN communication protocols) that are legacy protocols with respect to the first WLAN communication protocol. The one or more second WLAN communication protocols are sometimes collectively referred to herein as a "legacy WLAN communication protocol" or simply "legacy protocol."

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized. In some embodiments, one or more of the network interface device 162, the MAC processor 166, and the PHY processor 170 are configured similarly to the network interface device 122, the MAC processor 126, and the PHY processor 130, respectively.

The network interface device 162 is implemented using one or more ICs configured to operate as discussed below. For example, the MAC processor 166 is implemented on at least a first IC, and the PHY processor 170 is implemented on at least a second IC, in various embodiments. As another example, at least a portion of the MAC processor 166 and at least a portion of the PHY processor 170 is implemented on a single IC. For instance, the network interface device 162 is implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 is implemented, at least partially, on a first IC, and the network device 162 is implemented, at least partially, on a second IC, in various embodiments. As another example, the host processor 158 and at least a portion of the network interface device 162 is implemented on a single IC.

In various embodiments, the MAC processor 166 and the PHY processor 170 of the client device 154 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170. The PHY processor 170 is configured to receive MAC layer data units from the MAC processor 166 and encapsulate the MAC layer data units to generate PHY data units such as PPDUs for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units. In some embodiments, for example, the MAC processor 166 is configured similarly to the MAC processor 126. In an embodiment, for example, the MAC processor 166 includes multiple instances of the multi-band backoff timers 127.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. to provide at least some of the functionality described herein. In an embodiment, the MAC processor 166 includes a hardware state machine that provides at least some of the functionality described herein.

In an embodiment, the MAC processor 166 and the PHY processor 170 are configured to operate according to the first WLAN communication protocol, and also according to the legacy WLAN communication protocol.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, one or both of the client stations 154-2 and 154-3 are configured to operate according to the legacy WLAN communication protocol, but not according to the first WLAN communication protocol. Such client stations are referred to herein as "legacy client stations." Similarly, an access point that is similar to the AP 114 and is configured to operate according to the legacy WLAN communication protocol, but not according to the first WLAN communication protocol, is referred to herein as a "legacy AP." More generally, wireless communication devices that are configured to operate according to the legacy WLAN communication protocol, but not according to the first WLAN communication protocol, are referred to herein as a "legacy communication devices."

Figure 2A:
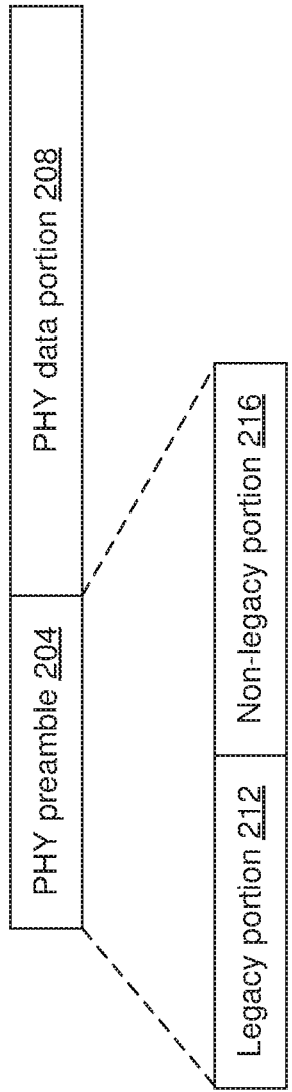
FIG. 2A is a block diagram of an example physical layer (PHY) data unit that is transmitted and/or received by a WLAN communication device of FIG. 1, according to an embodiment.

FIG. 2A is a diagram of an example PPDU 200 that the network interface device 122 (FIG. 1) is configured to generate and transmit to one or more client stations 154 (e.g., the client station 154-1), according to an embodiment. The network interface device 162 (FIG. 1) may also be configured to transmit data units the same as or similar to the PPDU 200 to the AP 114. The PPDU 200 may occupy a 20 MHz bandwidth or another suitable bandwidth. Data units similar to the PPDU 200 occupy other suitable bandwidth such as 40 MHz, 60 MHz, 80 MHz, 100 MHz, 120 MHz, 140 MHz, 160 MHz, 180 MHz, 200 MHz, etc., for example, or other suitable bandwidths, in other embodiments.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200.

Figure 2B:
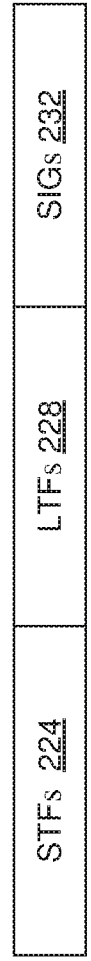
FIG. 2B is a block diagram of an example preamble of the PHY data unit of FIG. 2A, according to an embodiment.

FIG. 2B is a diagram of an example PHY preamble 220. In an embodiment, the PHY preamble 220 corresponds to the PHY preamble 204. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the number of LTFs in the LTFs 228 correspond to a number of spatial/space-time streams used for transmission of the PPDU 200. In an embodiment, the SIGs 232 are used to signal PHY communication parameters (e.g., a modulation and coding scheme (MCS), a number of spatial streams, a frequency bandwidth, etc.) corresponding to the PPDU 200. In an embodiment, the SIG field 232 is an extremely high throughput (EHT) signal field. In another embodiment, the SIG field 232 is a high efficiency (HE) signal field. In yet another embodiment, the SIG field 232 is a high throughput (HT) signal field. In an embodiment, the PHY preamble 220 (e.g., the legacy STFs 224, LTFs 228, and SIGs 232) is included in the legacy portion 212. In another embodiment, the PHY preamble 220 (e.g., the legacy STFs 224, LTFs 228, and SIGs 232) is included in the non-legacy portion 216.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the AP 114 and a plurality of client stations 154 are configured for multiple user (MU) communication using orthogonal frequency division multiple access (OFDMA) transmissions. In an embodiment, the PPDU 200 is an MU OFDMA data unit in which independent data streams are transmitted to or by multiple client stations 154 using respective sets of OFDM tones allocated to the client stations 154. For example, in an embodiment, available OFDM tones (e.g., OFDM tones that are not used as DC tones and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

In an embodiment, an operating communication channel of a communication device in the WLAN 110 is divided into a plurality of smaller component channels, each corresponding to a width of 20 MHz, or another suitable frequency bandwidth. Multiple component channels are concatenated, or "bonded" to form a wider channel, in some embodiments. For instance, a 40 MHz channel is formed by combining two 20 MHz component channels, an 80 MHz channel is formed by combining two 40 MHz channels, and a 160 MHz channel is formed by combining two 80 MHz channels, in various embodiments. In an embodiment, the operating frequency band is divided into component channels of a width different than 20 MHz. In some embodiments, the component channels are aggregated, as described below.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively. In some such embodiments, at least a portion of the PPDU 200 (e.g., at least a legacy portion of the PHY preamble 204, or the entirety of the PHY preamble 204) is generated by generating a field corresponding to a 20 MHz component channel bandwidth and repeating the field over a number of 20 MHz component channels corresponding to the transmission channel, in an embodiment. For example, in an embodiment in which the PPDU 200 occupies an 80 MHz contiguous channel, at least the legacy portion 212 corresponding to the 20 MHz component channel bandwidth is replicated and transmitted simultaneously in each of four 20 MHz component channels that comprise the 80 MHz channel.

In an embodiment, one or more communication devices in the WLAN 110 (e.g., the AP 114, the client station 154, etc.) are configured for various multi-channel operations. In an embodiment corresponding to multi-channel operation, two or more communication channels (also sometimes referred to herein as a "channel segments") are aggregated to form an aggregate channel for simultaneous transmission or reception over the two or more aggregated communication channels in the WLAN 110. For instance, in an embodiment, the AP 114 is configured to transmit a first signal (e.g., a first PPDU or portion thereof) in a first communication channel segment (sometimes referred to herein as "first channel segment"), and simultaneously transmit a second signal (e.g., a second PPDU or portion of the first PPDU) over a second channel segment (sometimes referred to herein as "second channel segment") where the first and second channel segments do not overlap. In some embodiments, the first and second signals are transmitted to a same communication device. In some embodiments, the first and second signals are transmitted to two or more different communication devices. In some embodiments, the first PPDU and second PPDU have a same payload (e.g., a management frame or multicast frame). In some embodiments, the first PPDU and second PPDU have different payloads (e.g., data frames for different communication devices). In some embodiments, the AP 114 commences transmission of the first signal and the second signal at a same start time (e.g., synchronously), for example, using multiple RF radios, as described herein. In an embodiment, the AP 114 is configured to cease transmission of the first signal and the second signal at a same end time. In an embodiment, the AP 114 is configured to cease transmission of the first signal and the second signal at different end times. In an embodiment, the AP 114 is configured to receive a first signal in a first channel segment and simultaneously receive a second signal over a second channel segment, wherein the first signal and the second signal have an identical start time. In an embodiment, the first signal and the second signal have identical end times. In another embodiment, the first signal and the second signal have different end times.

In an embodiment corresponding to multi-channel operation, the first channel segment and the second channel segment are non-contiguous, i.e., there is a gap in frequency between the first channel segment and the second channel segment. In another embodiment, the first channel segment and the second channel segment are contiguous, i.e., there is no frequency gap between the first channel segment and the second channel segment. In an embodiment, the first channel segment and the second channel segment are of different frequency bandwidths. In an embodiment, the first channel segment and the second channel segment consist of respective different numbers of component channels. In another embodiment, the first channel segment and the second channel segment are of a same bandwidth and consist of a same number of component channels.

In an embodiment, different communication devices (i.e., the AP 114 and the client stations 154) are configured for operation in different frequency bands. In an embodiment, at least some communication devices (e.g., the AP 114 and the client station 154) in the WLAN 110 are configured for operation over multiple different frequency bands. Example frequency bands include, a first frequency band corresponding to a frequency range of approximately 2.4 GHz-2.5 GHz ("2 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band"). Each of the frequency bands comprises plural component channels which are, in some embodiments, combined within the respective frequency bands to generate channels of wider bandwidths, as described above. In an embodiment corresponding to multi-channel operation over multiple communication channel segments aggregated to form an aggregated communication channel, at least some of the multiple channel segments are in different ones of multiple frequency bands, or the multiple channel segments are within a same frequency band.

In an embodiment, the first WLAN communication protocol permits a greater variety of communication channel configurations than is permitted by the legacy WLAN communication protocol. For example, the legacy WLAN communication protocol permits certain combinations of component channels to form communication channels of certain bandwidths, whereas the first WLAN communication protocol permits additional component channel combinations in addition to the component channel combinations permitted by the legacy WLAN communication protocol. For example, whereas the legacy WLAN communication protocol permits contiguous bandwidths of 20 MHz, 40 MHz, 80 MHz, and 160 MHz and a split frequency bandwidth 80+80 MHz, the first WLAN communication protocol additionally permits contiguous bandwidths of 60 MHz, 100 MHz, 120 MHz, 140 MHz, and split frequency bandwidths of 20+20 MHz, 20+40 MHz, 20+80 MHz, 40+40 MHz, 40+80 MHz, etc., in various embodiments. By using different frequency bandwidths, the first WLAN communication protocol allows for improved utilization of available spectrum, for example, the ability to use a 20+40 MHz split bandwidth channel instead of only a single 20 MHz bandwidth channel or single 40 MHz single bandwidth channel.

In an embodiment, a communication device (e.g., the AP 114, the client station 154-1, etc.) configured to operate according to the first WLAN communication protocol includes multiple RF radios, where respective ones of the multiple RF radios transmit/receive signals in respective RF channel segments of an aggregate communication channel. In some embodiments, the signals transmitted/received by respective ones of the multiple RF radios are synchronously transmitted/received in contiguous or non-contiguous channel segments. For example, a signal transmitted/received in an 80 MHz-wide channel segment by a first RF radio and a signal in a 40 MHz-wide channel segment is synchronously transmitted/received by a second RF radio, where the 80 MHz-wide and the 40 MHz-wide channel segments form a contiguous 120 MHz channel bandwidth in one embodiment, and form a non-contiguous 80+40 MHz channel bandwidth in another embodiment. In some embodiments, the signals transmitted/received by respective ones of the multiple RF radios are asynchronously transmitted/received in the contiguous or non-contiguous channel segments. In other words, signals transmitted or received by a first RF radio do not need to be synchronized in time with signals transmitted or received by a second RF radio. In an embodiment, for example, a first RF radio of a communication device transmits a first signal while a second RF radio of the communication device simultaneously receives (or transmits) a second signal, where the second RF radio begins transmitting or receiving the second signal after the first RF radio has begun transmitting the first RF signal (see, e.g., FIG. 9).

Figure 3A:
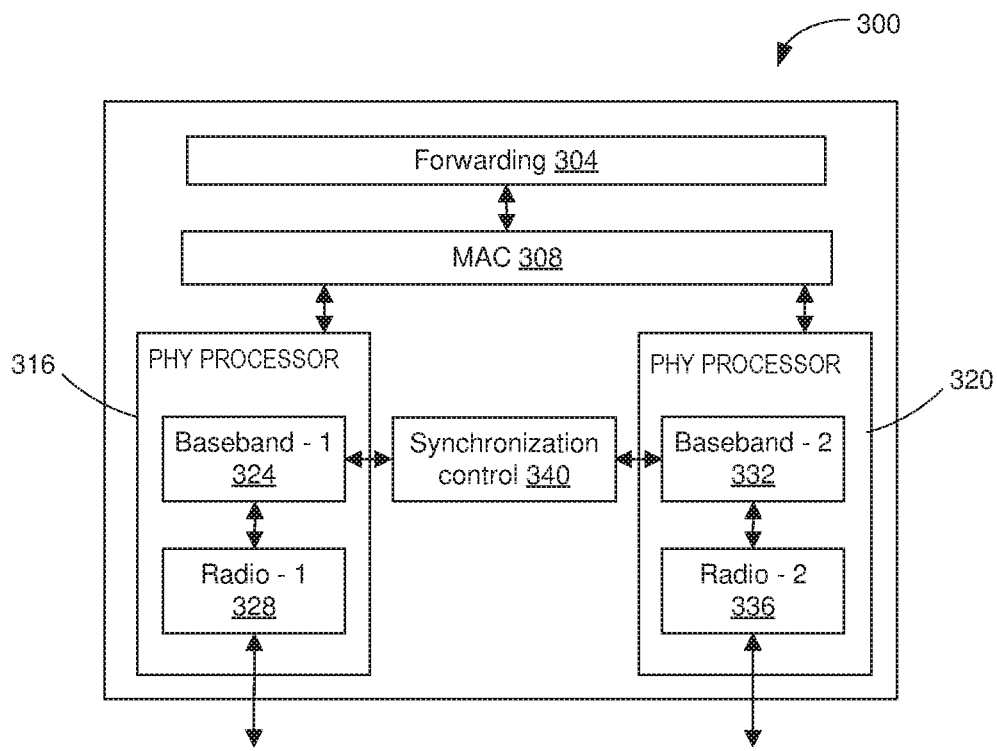
FIG. 3A is a diagram of an example system architecture corresponding to a communication device of FIG. 1 configured for multi-channel operation, according to an embodiment.

FIG. 3A is a diagram of an example system architecture 300 corresponding to a communication device configured for multi-channel operation (e.g., simultaneous transmission or reception over two or more aggregated communication channels), according to an embodiment. For instance, in an embodiment, the system architecture 300 is configured for transmission/reception over aggregated communication channel segments. In an embodiment, the system architecture 300 corresponds to the AP 114. In another embodiment, the system architecture 300 corresponds to the client station 154-1. In various embodiments, the system architecture 300 is configured for simultaneous transmission and/or reception over the aggregated communication channel. In an embodiment, the system architecture 300 is configured for synchronous transmission and/or reception over the aggregated communication channel. In an embodiment, the system architecture 300 is configured for asynchronous transmission and/or reception over the aggregated communication channel. In another embodiment, the system architecture is configured for both synchronous and asynchronous transmission and/or reception over the aggregated communication channel.

In an embodiment, the system architecture 300 is configured for operation over two communication channel segments and includes a forwarding processor 304. The communication device 300 also includes a single MAC processor 308, a first PHY processor 316, and a second PHY processor 320. The single MAC processor 308 is coupled to the first PHY processor 316 and the second PHY processor 320. Instead of communicating with only a single PHY processor and radio, the single MAC processor 308 is configured to exchange frames with multiple PHY processors, for example, the first PHY processor 316 and the second PHY processor 320. This enables the system architecture 300 to generate and transmit multiple PPDUs simultaneously in different RF bands, in an embodiment. In an embodiment, the MAC layer has an interface, for example, a data service access point (SAP) interface, to a layer above the MAC layer (e.g., a logical link control layer or network layer in the Open Systems Interconnection model). In another embodiment, the interface (i.e., data SAP interface) between the MAC layer and the layer above the MAC layer is integral with the MAC layer.

In some embodiments, the single MAC processor 308 corresponds to the MAC processor 126 or 166 of FIG. 1. In an embodiment, for example, the single MAC processor 308 includes one or more multi-band backoff timers 127. In an embodiment, the first PHY processor 316 and the second PHY processor 320 correspond to the PHY processor 130 or 170 of FIG. 1.

In some embodiments, the MAC processor 308 is implemented as different portions, for example, a higher layer portion that interfaces with the forwarding processor 304 and a lower layer portion that interfaces with the PHY processor 316 and 320. In an embodiment, the lower layer portion is implemented as separate portions, for example, a first lower layer portion that interfaces with the PHY processor 316 and a second lower layer portion that interfaces with the PHY processor 320.

The first PHY processor 316 includes a first baseband signal processor 324 (Baseband-1) coupled to a first RF radio 328 (Radio-1). The second PHY processor 320 includes a second baseband signal processor 332 (Baseband-2) coupled to a second RF radio 336 (Radio-2). In an embodiment, the RF radio 328 and the RF radio 336 correspond to the transceivers 134 of FIG. 1. In an embodiment, the RF radio 328 is configured to operate on a first RF band, and the RF radio 336 is configured to operate on a second RF band. In another embodiment, the RF radio 328 and the RF radio 336 are both configured to operate on the same RF band.

In an embodiment, the MAC processor 308 generates and parses data corresponding to MAC layer data units (e.g., frames) into a plurality of data streams corresponding to respective communication channel segments. In an embodiment, the frames can be transmitted in any channel segments dynamically, i.e., without a band switch negotiation. The MAC processor 308 provides the parsed data streams to the Baseband-1 324 and the Baseband-2 332. The Baseband-1 324 and the Baseband-2 332 are configured to receive the respective data streams from the MAC processor 308, and encapsulate and encode the respective data streams to generate respective baseband signals corresponding to PPDUs. In the embodiment shown in FIG. 3A, the MAC processor 308 is configured to transmit each MPDU by using either the PHY processor 316 or the PHY processor 320, but not both PHY processors. In other words, a single MPDU is transmitted within only a single band, but different MPDUs may be transmitted simultaneously in different bands.

In an embodiment, the respective baseband signals have different bandwidths. The Baseband-1 324 and the Baseband-2 332 provide the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 328 transmits a first RF signal via the first channel segment and the Radio-2 336 transmits a second RF signal via a second channel segment.

The communication device 300 also includes synchronization control circuitry 340, in some embodiments. The synchronization control circuitry 340 is configured to ensure that respective transmitted signals over the first channel segment and the second channel segment are synchronized. The synchronization control circuitry 340 is coupled to the Baseband-1 324 and the Baseband-2 332 to ensure that the respective baseband signals are synchronized in time.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the respective baseband signal processors Baseband-1 324 and Baseband-2 332. The Baseband-1 324 and the Baseband-2 332 generate respective data streams that are provided to the MAC processor 308. The MAC processor 308 processes the respective data streams. In an embodiment, the MAC processor 308 deparses the data streams received from the Baseband-1 324 and the Baseband-2 332 into a single information bit stream.

In an embodiment, the forwarding processor 304 is omitted and the MAC processor 308 is coupled to another suitable processor (e.g., the host processor 118 (FIG. 1)) that performs one or more higher level operations corresponding to data transmission and reception. For instance, in an embodiment, the other processor performs one or more operations corresponding to Layer 3 and above as characterized in the OSI model.

Figure 3B:
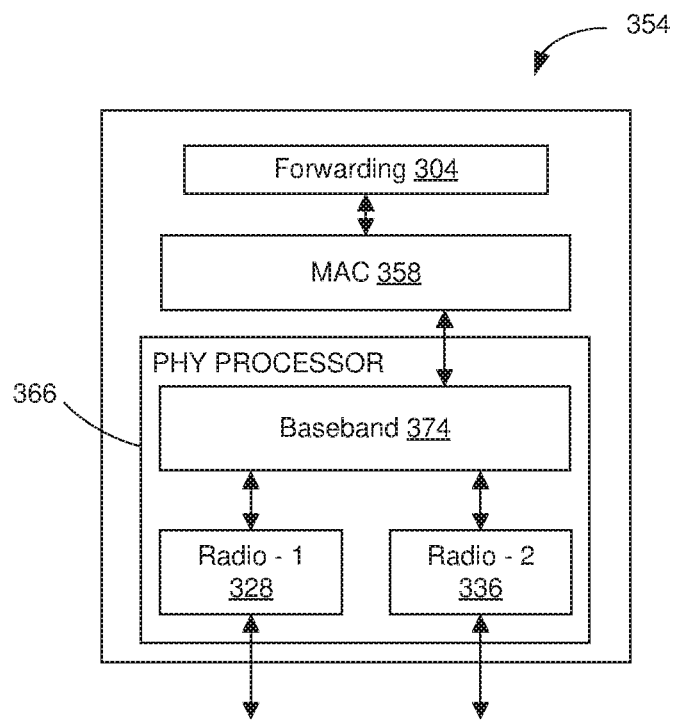
FIG. 3B is a diagram of an example system architecture corresponding to a communication device of FIG. 1 configured for multi-channel operation, according to another embodiment.

FIG. 3B is a diagram of an example system architecture 350 corresponding to a communication device configured for multi-channel operation (e.g., simultaneous transmission or reception over two or more aggregated communication channels), according to another embodiment. For instance, in an embodiment, the system architecture 350 is configured for synchronous and/or asynchronous transmission/reception over aggregated communication channels. In an embodiment, the system architecture 350 corresponds to the AP 114. In another embodiment, the system architecture 350 corresponds to the client station 154-1.

The system architecture 350 is similar to the system architecture 300 of FIG. 3A, and like-numbered elements are not discussed in detail for purposes of brevity. The communication device 350 includes a single MAC processor 358 coupled to a PHY processor 366. The single MAC processor 308 exchanges frames with the PHY processor 366. In an embodiment, the single MAC processor 358 corresponds to the MAC processor 126 of FIG. 1. In another embodiment, the single MAC processor 358 corresponds to the MAC processor 166 of FIG. 1. In an embodiment, the PHY processor 366 corresponds to the PHY processor 130 of FIG. 1. In another embodiment, the PHY processor 366 corresponds to the PHY processor 170 of FIG. 1. The PHY processor 366 includes a single baseband signal processor 374. The single baseband signal processor 374 is coupled to the Radio-1 328 and the Radio-2 336.

In an embodiment, the MAC processor 358 generates data corresponding to MAC layer data units (e.g., frames) and provides the frames to the baseband signal processor 374. The baseband signal processor 374 is configured to receive frames from the MAC processor 358, and parse data corresponding to the frames into a plurality of bit streams. The baseband signal processor 374 is also configured to encapsulate and encode the respective bit streams to generate respective baseband signals corresponding to PPDUs. In an embodiment, the respective baseband signals have different bandwidths. The baseband signal processor 374 provides the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 820 transmits a first RF signal via the first channel segment and the Radio-2 336 transmits a second RF signal via a second channel segment.

The baseband signal processor 374 is configured to ensure that respective transmitted signals over the first channel segment and the second channel segment are synchronized. For example, the baseband signal processor 374 is configured to generate the respective baseband signals such that the respective baseband signals are synchronized in time. In an embodiment, for example, the baseband signals are synchronized so that the start and end times of two different RF signals, corresponding to respective first and second PPDUs, are simultaneous.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the baseband signal processor 374. The baseband signal processor 374 generate respective bit streams, and de-parse the bit streams into a data stream corresponding to frames. The baseband signal processor 374 provides the frames to the MAC processor 358. The MAC processor 358 processes the frames.

In the embodiment shown in FIG. 3B, the MAC processor 358 is configured to transmit an MPDU by using only one PHY processor, or both the PHY processor 316 and the PHY processor 326. In other words, a single MPDU may span multiple bands or a single band.

As discussed above, in an embodiment, an operating communication channel of a communication device in the WLAN 110 is divided into a plurality of smaller component channels. In an embodiment, at least one of the smaller component channels is designated as a primary channel and the remaining component channels are secondary channels. In an embodiment, as described above, the primary channel is utilized for both management transmissions and data transmissions, while secondary channels are used for data transmissions but not management transmissions. A communication device (e.g., the AP 114 or the client station 154-1) operating in the WLAN 110 utilizes the at least one smaller component channel that is designated as a primary channel for various operations, such as for transmission of various management transmissions (e.g., transmissions for association of a client station 154 with the AP 114, beacon transmissions by the AP 114, operating channel bandwidths switch announcement transmissions, etc.), for conducting clear channel assessment (CCA) procedures, etc.

In an embodiment, an aggregate operating channel of a communication device (e.g., the AP 114 or the client station 154-1) includes multiple primary channels. For example, in an embodiment in which a first channel segment is aggregated with a second channel segment to form an aggregated communication channel, a first component channel in the first channel segment is designated as a first primary channel of the aggregate communication channel and a second component channel in the second channel segment is designated as a second primary channel of the aggregate communication channel. In some scenarios, designation of a primary channel in each channel segment promotes compatibility and fairness when sharing the channel segments with communication devices that do not support multi-channel operation. For example, where each primary channel has a backoff timer, the backoff timer reduces the likelihood of monopolization of one channel segment. In another embodiment, an aggregate communication channel of a communication device (e.g., the AP 114 or the client station 154-1) includes a single primary channel. For example, in an embodiment in which a first channel segment is aggregated with a second channel segment form an aggregate communication channel, a component channel in one of the first channel segment and the second channel segment is designated as a primary channel of the aggregate communication channel. The other one of the first channel segment and the second channel segment does not include a primary channel, in this embodiment.

Figure 4:
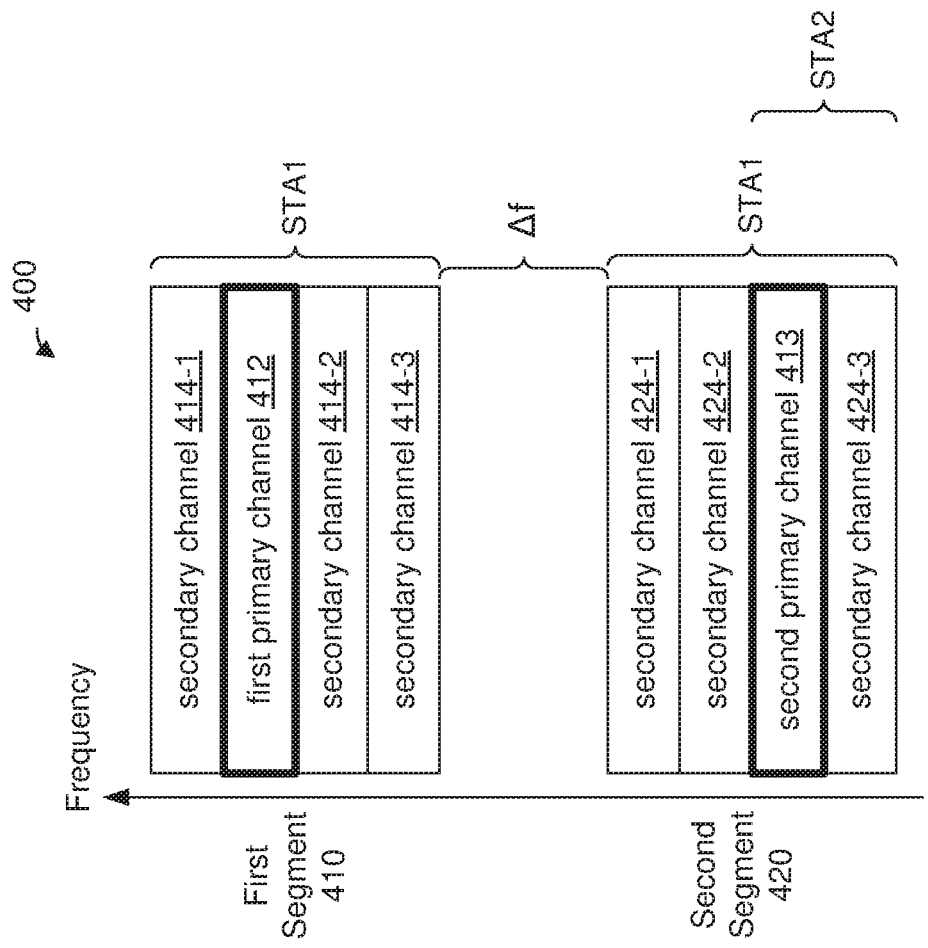
FIG. 4 is a diagram of an example multi-channel operating channel utilized by a WLAN communication device of FIG. 1, according to an embodiment.

FIG. 4 is a diagram of an example operating channel 400, according to an embodiment. In an embodiment, the operating channel 400 corresponds to an operating channel of the AP 114, or of a basic service set (BSS) supported by the AP 114. In another embodiment, the operating channel 400 corresponds to an operating channel of a client station 154 (e.g., the client station 154-1). In other embodiments, the operating channel 400 is employed by a communication device (e.g., an AP or a client station) in a suitable communication network different from the WLAN 110. An operating channel such as the operating channel 400 that corresponds to an operating channel of an AP or a BSS supported by the AP is sometimes referred to herein as an "AP operating channel" or a "BSS operating channel." An operating channel such as the operating channel 400 that corresponds to an operating channel of a client station is sometimes referred to herein as an "STA operating channel." In the embodiment shown in FIG. 4, the operating channel 400 corresponds to the AP 114, a first client station STA1, and a second client station STA2.

The operating channel 400 includes a first channel segment 410 aggregated with a second channel segment 420. The first channel segment 410 occupies a first frequency bandwidth and comprises a first number of component channels, and the second channel segment 420 occupies a second frequency bandwidth and comprises a second number of component channels. In various embodiments, the first bandwidth of the first channel segment 410 and the second bandwidth of the second channel segment 420 are equal or are unequal. In various embodiments, the first number of component channels of the first channel segment 410 and the second number of composite channels of the second channel segment 420 are equal or are unequal.

In an embodiment, the first channel segment 410 and the second channel segment 420 are non-adjacent in frequency (e.g., are non-contiguous). For example, a gap in frequency exists between the first channel segment 410 and the second first channel segment 420. In various embodiments, the gap is at least 500 kHz, at least 1 MHz, at least 5 MHz, at least 20 MHz, etc. In some embodiments, the first channel segment 410 and the second channel segment 420 are located in different bands, for example, 2.4 GHz, 5 GHz, and 6 GHz bands. In other embodiments, other suitable bands are utilized (e.g., 60 GHz, "sub-1 GHz" or 900 MHz, 3.6 GHz, 4.9 GHz, etc.). In another embodiment, the first channel segment 410 and the second channel segment 420 are adjacent in frequency (e.g., contiguous). In this embodiment, there is no frequency gap between first channel segment 410 and the second channel segment 420.

In an example embodiment, the first channel segment 410 has a bandwidth of 80 MHz and the second channel segment 420 has a bandwidth of 80 MHz. In an embodiment in which the first channel segment 410 and the second channel segment 420 are not adjacent in frequency, the operating channel 400 is sometimes referred to as an 80+80 MHz channel. On the other hand, in an embodiment in which the first channel segment 410 and the second channel segment 420 are adjacent in frequency, the operating 400 is sometimes referred to as 160 MHz channel. In general, communication channels similar to the operating channel 400 in which the first channel segment and the second channel segment are not adjacent in frequency, the aggregate communication channel is referred to as (bandwidth of the first channel segment)+(bandwidth of the second channel segment) channel. On the other hand, communication channels similar to the operating channel 400 in which the first channel segment and the second channel segment are adjacent in frequency, or in which the second channel segment 420 is omitted (i.e., the second channel segment 420 has a bandwidth of 0 MHz), the aggregate communication channel 400 is referred to as (the sum of the first channel segment bandwidth and the second channel segment bandwidth) channel. In an embodiment, valid channel configurations of the aggregate communication channel 400 include: 20 MHz channel, 40 MHz channel, 60 MHz channel, 80 MHz channel, 100 MHz, 120 MHz channel, 140 MHz channel, 160 MHz channel, 320 MHz channel, 20+40 MHz channel, 20+80 MHz channel, 40+80 MHz channel, 20+160 MHz, 40+320 MHz, and so on. In an embodiment, a respective bandwidth of each channel segment 410, 420 is selected from a set of possible channel bandwidths of 20 MHz, 40 MHz and 80 MHz. In other embodiments, other suitable sets of possible bandwidths are utilized.

In the embodiment shown in FIG. 4, the operating channel 400 includes a single primary channel per channel segment. For example, the AP 114 designates a single component channel of the first channel segment 410 as a primary channel and a single component channel of the second channel segment 420 as a primary channel, in an embodiment. In the illustrated embodiment, a first component channel of the first channel segment 410 is designated as a first primary channel 412 and a second component channel of the second channel segment is designated as a second primary channel 413. In some embodiments, the operating channel 400 includes more than two primary channels. For example, more than two component channels of the operating channel 400 are designated as primary channels, in some embodiments.

The operating channel 400 also includes secondary channels, in an embodiment. In an embodiment, the AP 114 designates each component channel of the first channel segment 410 and the second channel segment 420 that is not designated as a primary channel as a secondary channel. In the illustrated embodiment, the first channel segment 410 includes three secondary channels 414 and the second channel segment 420 includes three secondary channels 424. In other embodiments, the first channel segment 410 and/or the second channel segment 420 includes another suitable number (e.g., 0, 1, 2, 4, 5, etc.) of secondary channels 414, 424. In some embodiments, the number of secondary channels 414 of the first channel segment 410 is not equal to the number of secondary channels 424 of the second channel segment 420.

In some embodiments, the AP 114 designates a primary channel in some bands, but not all bands. In an embodiment, for example, the AP 114 designates a primary channel for a 5 GHz band and a 2.4 GHz band, but does not designate a primary channel for a 6 GHz band, where each of the 2.4 GHz, 5 GHz, and 6 GHz bands form a portion of the operating channel. In another embodiment, each component channel of the operating channel is designated as a primary channel.

In some embodiments, the AP 114 generates one or more MAC data units to include: i) a first primary channel indication indicating a first location, in the first channel segment 410, of the first primary channel and ii) a second primary channel indication indicating a second location, in the second channel segment 420, of the second primary channel.

In some embodiments, the AP 114 changes one or more of the primary channels to different component channels within the operating channel 400. In an embodiment, for example, the MAC processor 126 of the AP 114 designates a second component channel that was previously designated as a secondary channel as a second primary channel and designates the first primary channel as a secondary channel. In an embodiment, for example, the AP 114 utilizes the first primary channel 412 for at least one of transmitting or receiving MPDUs via the first component channel, before designating the second component channel 414-2 as a second primary channel.

In an embodiment, legacy client stations that conform to the legacy protocol do not support an operating channel in multiple channel segments or with multiple primary channels. In some embodiments, to facilitate interoperability of the AP 114 with legacy client stations, the first communication protocol does not permit multiple primary channels in an AP operating channel when the AP operating channel is also supported by the legacy protocol. Accordingly, in an embodiment, the AP 114 is configured to operate with an AP operating channel that includes a single primary channel when the operating channel is also permitted by the legacy protocol, and to operate with an AP operating channel that includes multiple primary channels when the operating channel is not permitted by the legacy protocol.

In some embodiments, an operating channel of a client station (e.g., the client station 154-1) has a bandwidth that is narrower than a bandwidth of an operating channel of the AP 114. In an embodiment, a client station 154 (e.g., the client station 154-1) operating with an operating channel that is narrower than an operating channel of the AP 114 is permitted to operate at any location within the operating channel of the AP 114. For example, the client station 154-1 is permitted to operate with an operating channel that does not cover a primary channel of the AP 114. In another embodiment, the client station 154 (e.g., the client station 154-1) operating with an operating channel that is narrower than an operating channel of the AP 114 is not permitted to operate with an operating channel that does not cover a primary channel of the AP 114. In this embodiment, an operating channel of the client station 154 (e.g., the client station 154-1) that is narrower than an operating channel of the AP 114 operates at a location within the operating channel of the AP 114 that covers at least one primary channel of the AP 114 (e.g., client station STA2 operates within channels 413 and 424-3).

In some embodiments, the AP 114 designates the channel segments of the operating channel 400 as "working" or "main" bands and "subsidiary" bands. In an embodiment, for example, the AP 114 designates the first channel segment 410 as a main band and designates the second channel segment 420 as a subsidiary band. In some embodiments, the AP 114 and client stations 154 use the subsidiary bands for transmission or reception of acknowledgment frames, block acknowledgment frames, channel sounding information, channel sounding feedback, link adaptation frames, or other management frames, while using the main bands for data frame transmission. In some embodiments, the AP 114 and client stations 154 merely prioritize the use of the main bands for data frames and prioritizes the subsidiary bands for management frames. In an embodiment, for example, the AP 114 utilizes both main and subsidiary bands for transferring data frames when a buffer size of queued data reaches a predetermined threshold and a higher bandwidth is desired.

In some embodiments, the AP 114 and client stations 154 are configured to use the main band for high priority frames, while using the subsidiary bands for lower priority frames. In various embodiments, priority of the data frames are based on a traffic identifier (TID) of the frame, a traffic class (TC) of the frame, a quality of service (QoS) level of the frame, or other suitable characteristic. In an embodiment, the AP 114 solicits transmissions from client stations using a trigger frame in either the main band or the subsidiary band. In an embodiment, the client station 154 transmits frames using Enhanced Distributed Channel Access (EDCA) methods in either the main band or the subsidiary band. In an embodiment, the AP 114 is configured to disallow or disable use of EDCA methods in some bands (e.g., in the main band).

In some embodiments where the AP 114 prioritizes the main band for data frames, the AP 114 and client stations 154 are configured to send acknowledgments to the data frames on subsidiary bands (i.e., a data frame received on a main band is acknowledged on the subsidiary band). In some embodiments, the AP 114 and client stations 154 also transmit buffer status reports, channel availability reports, and sounding feedback on the subsidiary band. In various embodiments, the AP 114 polls the client station 154 for the acknowledgment frame, buffer status report, or channel availability report using a trigger frame in the subsidiary band. In other embodiments, the client station 154 automatically transmits the acknowledgment frame, buffer status report, channel availability report, or sounding feedback to the AP 114 in the subsidiary band. In an embodiment, the client station 154 performs a backoff procedure on the subsidiary band before transmitting the acknowledgment frame, buffer status report, or channel availability report. In another embodiment, the client station 154 checks whether the subsidiary band is idle for a predetermined time period (e.g., distributed control function interframe space, arbitrary inter-frame space) before transmitting the acknowledgment frame, buffer status report, or channel availability report. In another embodiment, the AP 114 performs the backoff procedure or checks whether the subsidiary band is idle before transmitting the trigger frame.

In another embodiment where the AP 114 prioritizes the main band for data frames, the AP 114 and client stations 154 are configured to send acknowledgments to the data frames on the band on which they were received (i.e., a data frame received on the main band is acknowledged on the main band, while a data frame received on the subsidiary band is acknowledged on the subsidiary band).

In some embodiments, a communication device (e.g., AP 114 and/or client station 154) performs a medium access procedure (e.g., clear channel access) before utilizing a component channel. In an embodiment, the communication device performs a different medium access procedure for component channels of a same BSS that are in different bands. In an embodiment, for example, the communication device performs a first medium access procedure for a first component channel and performs a second medium access procedure for a second component channel that is in a different band from the first component channel. In an embodiment, the communication device utilizes same association procedures (e.g., block acknowledgment negotiation, key negotiation, target wake time negotiation) across the component channels of the BSS, but utilizes the different medium access procedures.

In some scenarios, an AP 114 or client station 154 cannot decode a data portion of a packet that is currently being received on one of the bands, for example, due to a problem with the BSS color, AID, a downlink/uplink indication, or other decoded field in the PHY header of the packet. In an embodiment, the AP 114 and client station 154 are configured to transmit a negative acknowledgment (NAK) in the subsidiary band to the sender of the packet to cause the sender to stop sending the packet prior to completion of the transmission. In this way, the medium is freed and can be utilized for another transmission more quickly.

In other embodiments, the AP 114 does not designate channel segments of the operating channel 400 as main or subsidiary bands. In an embodiment, when a data frame or trigger frame is transmitted in a first band, transmission of subsidiary information (e.g., an acknowledgment, solicited QoS data frame, or a management frame) is performed in a second, different band. In another embodiment, the subsidiary information is transmitted in a same band as the data frame or trigger frame. In an embodiment, the AP 114 and the client stations 154 are configured to transmit QoS data frames from a single TID within any band of the operating channel 400. In an embodiment, for example, a single TID value is designated as a priority TID that may be transmitted via any band of the operating channel 400.

In some embodiments, the AP 114 and/or the client station 154 is configured to utilize a single MAC address for all channel segments of the operating channel 400. In other words, a packet received (or transmitted) on the first segment 410 is addressed to (or from) a first MAC address and a packet received (or transmitted) on the second segment 420 is also addressed to (or from) the first MAC address. In these embodiments, retransmission of a packet is simplified because the packet can be retransmitted in the same channel segment or a different channel segment without changing the MAC address. In an embodiment, for example, the AP 114 transmits a first MPDU to the client station 154 via the first segment 410 and, after a negative acknowledgment or no acknowledgment of the first MPDU, the AP 114 retransmits the first MPDU to the client station 154 via the second segment 420 using the same MAC address of the client station 154 (e.g., as the destination address), and/or using the same MAC address of the AP 114 (e.g., as the source address). In one such embodiment, the AP 114 and/or client station 154 is configured as shown in FIG. 3A or FIG. 3B, having a single MAC processor 308 or 358 that utilizes the single MAC address. In another embodiment, the AP 114 and/or client station 154 is configured.

In some embodiments, the AP 114 and/or the client station 154 is configured to utilize different MAC addresses for the different channel segments of the operating channel 400. In other words, a first packet received (or transmitted) on the first segment 410 is addressed to (or from) a first MAC address associated with the first channel segment and a second packet received (or transmitted), simultaneously with the first packet, on the second segment 420 is addressed to (or from) a second, different MAC address associated with the second channel segment. In an embodiment, for example, with reference to FIG. 3A, the MAC processor 308 is implemented as two separate MAC processors that are coupled to respective PHY processors (e.g., a first MAC processor 308-1 coupled to the first PHY processor 316 and a second MAC processor 308-2 coupled to the second PHY processor 320). In an embodiment, for example, the AP 114 transmits a first MPDU (with a first MAC address of the client station 154 as a destination address) to the client station 154 via the first segment 410 and, after a negative acknowledgment or no acknowledgment of the first MPDU, the AP 114 retransmits the first MPDU (with a second MAC address of the client station 154 as the destination address) to the client station 154 via the second segment 420.

In some embodiments, a communication device that supports an operating channel that combines multiple component channels (e.g., AP 114 or client station 154) enters a power save mode on only some of the component channels. In an embodiment, for example, a client station 154 associates a first PHY processor (e.g., PHY processor 316) with a first channel segment (e.g., segment 410) of an operating channel and associates a second PHY processor (e.g., PHY processor 320) with a second channel segment (e.g., segment 420) of the operating channel. In some embodiments, the client station 154 causes the first PHY processor to enter a power save mode while the second PHY processor is in an active mode. In an embodiment, the client station 154 causes only a transceiver and/or an RF radio of the first PHY processor to enter the power save mode while the second PHY processor is in the active mode. Since both PHY processors are associated with the operating channel, the client station 154 is still able to communicate with the AP 114 via the second PHY processor and also has reduced power consumption (e.g., from a battery, not shown) with the first PHY processor in the power save mode.

In an embodiment, the client station 154 generates (e.g., by the first PHY processor) a first PPDU that indicates entry into the power save mode by the first transceiver. In an embodiment, the first PPDU is a Null data frame having a Power Management bit set to "1" within a frame control field (not shown). The client station 154 transmits the first PPDU to the AP 114 to announce the entry into the power save mode, for example. To return from the power save mode to an active mode, the client station 154 transmits a second PPDU, for example, a power save poll frame, to the AP 114. In some embodiments, when the client station 154 changes its mode from the active mode to the power save mode, or from the power save mode to the active mode, the mode change applies to each band of the operation channel. In other words, the client station 154 sends the first PPDU (null data frame) to the AP 114 in either of the first channel segment 410 or the second channel segment 420, and the client station 154 then enters the power save mode on both channel segments.

In another embodiment, when the client station 154 changes its mode from the active mode to the power save mode, or from the power save mode to the active mode, the mode change applies only to the band of the operation channel in which the first PPDU was transmitted. In an embodiment, for example, the client station 154 transmits the first PPDU to the AP 114 by the first PHY processor 316 via the first primary channel 412 of the first segment 410, enters the first PHY processor 316 into the power save mode, and continues communication with the AP 114 via the second channel segment 420 using the second PHY processor 320. In some embodiments, the AP 114 transmits frames that are buffered at the AP 114 for the client station 154 to the client station 154 through any channel segment that is not in a power save mode.

In some embodiments, a multi-band AP 114 or multi-band client station 154 (e.g., devices that support multiple bands) dynamically enters the power save mode on only some bands for reduced power consumption. In an embodiment, the multi-band AP or multi-band client station exits the power save mode and enters an active mode on one or more bands to provide improved throughput. In an embodiment, the multi-band AP or multi-band client station changes its operating channel bandwidth. In various embodiments, the multi-band AP or multi-band client station indicates the entry into the power save mode, entry into the active mode, and/or the change in operating channel bandwidth using one or more of an information element of a management frame, an extremely high throughput (EHT) variant high throughput (HT) control field, and a high efficiency (HE) variant HT control field.

In some embodiments, the number of channel segments in an operating channel of a BSS is larger than a number of channel segments allowed within a PPDU. In other words, in an example where the AP 114 provides a BSS having a 2.4 GHz band, a 5 GHz band, and a 6 GHz band, the AP 114 is configured to generate a PPDU that uses at most two bands (e.g., 5 GHz and 6 GHz). In an embodiment, the AP 114 performs transmissions within the two bands independently. In other words, the AP 114 performs frame exchanges in different bands (e.g., the 5 GHz band and the 6 GHz band) where the signals transmitted/received by respective ones of RF radios are asynchronously transmitted/received in the channel segments. In some embodiments, the frame exchanges in the different bands have a same initiating device (e.g., AP 114) and responding device (e.g., client station 154). In other embodiments, the frame exchanges in the different bands have different initiating devices and responding devices.

In some embodiments, the AP 114 performs transmissions within the two bands simultaneously. In an embodiment, for example, the AP 114 performs a transmission of a first PPDU to a client station 154 in the first channel segment 410 simultaneously with performing a transmission of a second PPDU to the client station 154 in the second channel segment 420. In other words, the first PPDU and the second PPDU have a same start time, a same PHY header length, and a same end time. In some scenarios, transmission of the first and second PPDUs on different channel segments allows for a shorter duration of the transmission, which reduces congestion of at least one of the channel segments. In an embodiment, the AP 114 uses same values for one or more of a modulation and coding scheme (MCS), a number of spatial streams (NSS), or other suitable parameters across the different channel segments, for example, to reduce the number of parameters that must be managed by the AP 114, in some scenarios. In another embodiment, the AP 114 utilizes first values of the parameters in the first channel segment that are different from second values of the parameters in the second channel segment. In some scenarios, utilizing different values of the parameters allows for a more efficient use of the channel segments, for example, by using a higher MCS value (i.e., providing higher data rates) in the first channel segment and a lower MCS value (i.e., providing lower data rates, but improved decodability) in the second channel segment when the first channel segment has a higher signal to noise ratio.

In an embodiment, the AP 114 performs transmissions within the two bands simultaneously and is configured to utilize the two bands as a single logical MAC channel. In other words, the AP 114 maps a first portion of an MPDU to a PPDU in the first channel segment 410 and maps a second portion of the MPDU to a PPDU in the second channel segment 420. In another embodiment, the AP 114 performs transmissions within the two bands simultaneously, but is configured to utilize the two bands as separate MAC channels. In other words, the AP 114 generates a plurality of MPDUs and generates a first PPDU for the first channel segment 410 and a second PPDU for the second channel segment 420 so that respective ones of the plurality of MPDUs are included in only one of the first PPDU and the second PPDU. In an embodiment, the AP 114 generates MPDUs having a same traffic identifier (TID) for simultaneous transmission in multiple bands. In another embodiment and/or scenario, the AP 114 generates MPDUs having different TIDs for simultaneous transmission in multiple bands.

FIG. 5A and FIG. 5B are example timing diagrams 500 and 550 for a WLAN communication device configured to use a plurality of component channels of a WLAN communication channel 502, in an embodiment. In an embodiment, the operating channel 502 corresponds to an operating channel of the AP 114, or of a basic service set (BSS) supported by the AP 114. In an embodiment, the operating channel 502 corresponds to an operating channel of a client station 154 (e.g., the client station 154-1). In other embodiments, the operating channel 502 is employed by a communication device (e.g., an AP or a client station) in a suitable communication network different from the WLAN 110. The operating channel 502 is similar to the operating channel 400, but includes four component channels Ch0, Ch1, Ch2, and Ch3 and has one primary channel (i.e., Ch0). In other embodiments, the operating channel 502 has multiple primary channels (e.g., Ch2 is also a primary channel). Although the component channels are shown as being contiguous, in other embodiments, one or more of the component channels are located in different frequency bands with one (or more) primary channel in each band and/or are separated by a frequency gap, as described above. In an embodiment, for example, the component channels Ch0 and Ch1 are located in a channel segment within a 5 GHz band and the component channels Ch2 and Ch3 are located in a channel segment within a 6 GHz band.

Before transmitting MPDUs via the operating channel 502, the AP 114 performs a backoff procedure that includes waiting for an expiration of a backoff timer that corresponds to the primary channel. The backoff timer promotes sharing of the operating channel 502 with other communication devices, with each communication device waiting for a different length of time before attempting to use the operating channel 502. In various embodiments, the backoff timer is set based on a group of respective backoff parameters, for example, for each access category (AC) (i.e., one of AC_BE (best effort), AC_BK (background), AC_VI (video), AC_VO (voice)), there is a backoff timer (e.g., an instance of the backoff timer 516), a contention window CW, a contention window minimum (CWmin), a contention window maximum (CWmax), a slot time, an arbitrary inter-frame space number (AIFSN), a quality of service short retry counter (QSRC), and a quality of service long retry counter (QLRC).

In the embodiment shown in FIG. 5A, the AP 114 designates component channel Ch0 as a primary channel over the operating channel 502, corresponding to backoff timer 506, and designates component channels Ch1, Ch2, and Ch3 as secondary channels. In other embodiments, the AP 114 uses additional or fewer primary channels over a different suitable operating channel. In an embodiment, the component channels Ch0 and Ch1 are located in a first band (e.g., 5 GHz), the component channels Ch2 and Ch3 are located in a second, different band (e.g., 6 GHz), the AP 114 designates the first band as a main band, and designates the second band as a subsidiary band.

In an embodiment, the AP 114 checks an idle/busy status of secondary channels, for example, component channels Ch1, Ch2, and Ch3, when the backoff timer 506 expires before performing a transmission. When one or more other component channels are idle within a suitable time period (e.g., a point control function interframe space, distributed control function interframe space) before the backoff timer 506 expires, the AP 114 performs, schedules, or triggers an uplink or downlink transmission in the one or more idle component channels. In an embodiment, the AP 114 checks the idle status of secondary channels only after determining that the backoff timer for the corresponding primary channel has expired. In some embodiments, the backoff timers of any band can be used for the backoff of simultaneous transmission of multiple bands (channel segments).

In some embodiments, the AP 114 utilizes only those idle component channels that satisfy corresponding channel bounding rules for transmission. In the embodiment shown in FIG. 5A, the AP 114 determines that component channel Ch2 is busy, component channels Ch0, Ch1, and Ch3 are idle, but that channel bounding rules do not allow for a punctured PPDU. In this embodiment, the PHY processor 130 of the AP 114 transmits an unpunctured downlink PPDU 540 and receives an unpunctured uplink PPDU 542 that utilize only the component channels Ch0 and Ch1. After the exchange of the PPDUs 540 and 542, the AP 114 sets the contention window for the backoff timer 506 to CWmin to indicate a successful frame exchange.

In the embodiment shown in FIG. 5B, the AP 114 determines that component channel Ch2 is busy, component channels Ch0, Ch1, and Ch3 are idle, and that channel bounding rules allow for a punctured PPDU. In this embodiment, the AP 114 transmits a punctured downlink PPDU 590 and receives an unpunctured uplink PPDU 592 that utilize the component channels Ch0, Ch1, and Ch3. After the exchange of the PPDUs 590 and 592, the AP 114 sets the contention window for the backoff timer 506 to CWmin to indicate a successful frame exchange.

In various embodiments, the AP 114 indicates the bands utilized for transmission of a PPDU, such as the PPDUs 540 and 590. In an embodiment, the AP 114 sets an EHT PHY SIG field (e.g., field 232) in a PHY header of each component channel to indicate the bands utilized for the PPDU and the channel segments in those bands. In an embodiment, for example, the AP 114 sets respective EHT PHY SIG fields in each of the component channels Ch0, Ch1, and Ch3 to indicate i) the main band, ii) the component channels Ch0 and Ch1, iii) the subsidiary band, and iv) the component channel Ch3 in the embodiment shown in FIG. 5B. In another embodiment, the AP 114 sends a control frame (not shown) prior to the transmission of the PPDU 540 that indicates the bands and their component channels to be used for the PPDUs 540 and 542 (or PPDUs 590 and 592). In yet another embodiment, the AP 114 sets an EHT PHY SIG field (e.g., field 232) in a PHY header of each component channel to indicate the channel segments in the corresponding bands utilized for the PPDU. In an embodiment, for example, the AP 114 sets respective EHT PHY SIG fields in the component channels Ch0 and Ch1 to indicate the component channels Ch0 and Ch1 and sets an EHT PHY SIG field in the component channel Ch3 to indicate the component channel Ch3, in the embodiment shown in FIG. 5B.

In some embodiments and/or scenarios, the AP 114 is configured to utilize only a single band even when components within a different band are idle. In an embodiment, for example, the AP 114 utilizes only a single band (e.g., the main band) when a legacy STA or single band STA (e.g., a client station 154 that is not configured to utilize multiple bands simultaneously) initiates a transmission opportunity. In another embodiment, the AP 114 utilizes only a single band (e.g., the main band or subsidiary band) when the responding client stations are all associated with the single band. In some scenarios, when the AP 114 utilizes a single band for a first frame exchange (e.g., a transmission to a legacy STA or single band STA), the AP 114 utilizes a different band for a second frame exchange. In various embodiments and/or scenarios, the second frame exchange is within the same BSS, from a same initiating device, or from a different initiating device.

In some embodiments, the AP 114 utilizes the same PHY parameters and/or MAC parameters, such as MCS values, NSS values, and BW values, for simultaneous transmissions of PPDUs that span multiple bands to a single client station. For example, the AP 114 sets at least some PHY parameters that correspond to the component channels Ch0 and Ch1 and at least some PHY parameters that correspond to the component channel Ch3 to same respective values when transmitting to a same device. In the embodiment shown in FIG. 5B, for example, the AP 114 generates the PPDU 590-1 in the subsidiary band to have a same MCS value and NSS value as the PPDU 590-2 in the main band. In another embodiment, for example, the AP 114 generates the PPDU 590-1 in the subsidiary band to have different MCS values and/or NSS values as the PPDU 590-2 in the main band. In some embodiments, the AP 114 sets at least some PHY parameters for particular bands to be the same, while those PHY parameters are different for other bands. In an embodiment, for example, the AP 114 uses the same values for MCS and NSS in 5 GHz and 6 GHz bands, but uses different values in 2 GHz bands.

In some embodiments, the AP 114 announces support for one or more PHY parameters and/or MAC parameters, such as the MCS, NSS, and BW values, to the client stations. In an embodiment, the AP 114 announces MCS values and NSS values, which may be the same or different values, supported by the AP 114 for each of its supported bands. In an embodiment, for example, the AP 114 announces that it supports first and second MCS values in the main band, but only supports the second MCS value in the subsidiary band. In some embodiments, the AP 114 announces its supported PHY parameters in a separate management frame within each supported band, for example, in separate beacon frames within each supported band. In an embodiment, the beacon frame includes the supported PHY parameter for only the band in which it is transmitted. In another embodiment, the beacon frame includes the supported PHY parameter for each band supported by the AP 114. In some embodiments, the AP 114 combines the announcements of PHY parameters for some bands. In other words, the AP 114 generates and transmits a single management frame that announces one or more PHY parameters and/or MAC parameters. In an embodiment, for example, the AP 114 announces the MCS, NSS, and BW values for the 5 GHz band and 6 GHz band in a same beacon frame, but uses a separate beacon frame for announcing the MCS, NSS, and BW values for the 2.4 GHz band. In some embodiments, the AP 114 generates and transmits a single management frame that announces one or more PHY parameters and/or MAC parameters, including different values for different bands for some parameters, and same values (or a single value) for different bands for other parameters. In an embodiment, the single management frame announces different values for MCS, NSS, DCM, and BW parameters for different bands. In an embodiment, the single management frame announces that other parameters (e.g., TWT, SM power save, security, multiple BSSID, or other parameters) are the same for the bands supported by the AP 114.

In some embodiments, the AP 114 transmits a beacon frame in the primary component channel of the main band using an EHT PPDU. In an embodiment, an EHT Operation element (not shown) of the beacon frame indicates the primary component channel, the BW of the main band which includes the primary component channel, and any subsidiary bands (e.g., those subsidiary bands that do not have a primary channel on which to broadcast a beacon frame).

In various embodiments, legacy stations are those client stations 154 that do not support the EHT protocol, for example, devices that support only up to an 802.11ax protocol, 802.11ac protocol, or other legacy protocol. In various embodiments, single band stations are those client stations 154 that are configured to support only a single band at a time, for example, devices that have only a single RF radio or PHY processor. In some embodiments, the AP 114 associates legacy stations and/or single band stations of a BSS with the band that includes the primary channel (e.g., the main band of FIG. 5B). In some embodiments, legacy stations and/or single band stations switch to other channels or bands (e.g., including those that do not include the primary channel) during target wake time service periods (TWT SPs) that are negotiated with the AP 114. Outside of those negotiated TWT SPs, the legacy stations and single band stations operate in the main band.

In some embodiments, the AP 114 is configured to utilize the operation channel 400 with multiple primary channels. In an embodiment, for example, the AP 114 designates the component channel Ch0 of the main band and the component channel Ch3 of the subsidiary band as primary channels. In this embodiment, each primary channel has a separate backoff timer (e.g., similar to backoff timer 506). In an embodiment, In some embodiments, an AP 114 that is about to transmit a PPDU on a first band (e.g., channel segment 410) does not utilize secondary channels of a different band (e.g., channel segment 420) when the backoff timer associated with the primary channel of the different band is non-zero, even when those secondary channels are idle. In another embodiment, the AP 114 utilizes the secondary channels of the different band, but adds a remaining value of the backoff timer of the different band to a random (or pseudo-random) initial value of the backoff timer when the backoff timer is set with a new contention window.

In some scenarios, when a multi-band AP or multi-band client station transmits multiple PPDUs on different bands with A-MPDUs having QoS data frames from a same TID that overlap with each other in the time domain, some communication devices that receive the QoS data frames have difficulty processing the data frames with the same TID within the multiple PPDUs, for example, where different PHY processors handle frames for the different bands and a single block acknowledgment bitmap and frame buffer are utilized for the same TID. In other words, the block acknowledgment bitmap and frame buffer for the same TID must be utilized by both PHY processors for the different bands when frames from the same TID are received on the different bands. In some embodiments, a multi-band AP or multi-band client station announces whether it is able to process multiple PPDUs on different bands with A-MPDUs having QoS data frames from a same TID and that overlap in the time domain. In some embodiments, the AP or client station does not allow multiple PPDUs on different bands with A-MPDUs having QoS data frames from a same TID and that overlap in the time domain.

In some embodiments, the AP 114 selects some PHY parameters, such as BSS colors, association identifiers (AIDs) for client stations, and target beacon transmission times (TBTTs) for beacon frames, for operating channels that span multiple bands. In an embodiment, the AP 114 selects a same BSS color for use in each of the bands (e.g., main band and subsidiary bands share a same BSS color). In another embodiment, the AP 114 selects different BSS colors for use in each of the bands. In an embodiment, the AP 114 selects a same AID for a multi-band client station for identification of that multi-band client station in each of the bands. In another embodiment, the AP 114 selects different AIDs for each band in which a multi-band client station is associated. In an embodiment, the AP 114 selects a same TBTTs for use in each of the bands. In another embodiment, the AP 114 selects different TBTTs for use in each of the bands.

Figure 6:
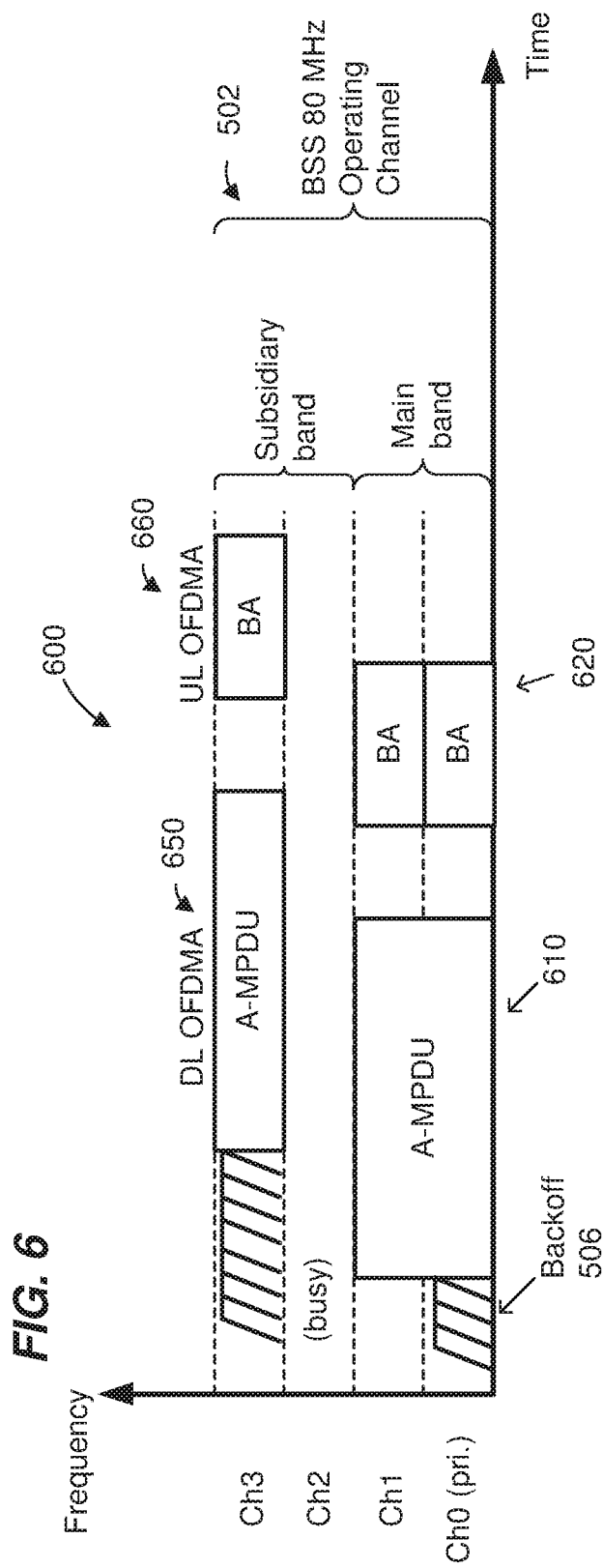
FIG. 6 is an example timing diagram for a WLAN communication device of FIG. 1 configured to use a plurality of component channels of a WLAN communication channel, in another embodiment.

FIG. 6 is an example timing diagram 600 for a WLAN communication device configured to use a plurality of component channels of the WLAN communication channel 502, in an embodiment. In some embodiments, the AP 114 performs transmissions within two or more bands asynchronously. In other words, the AP 114 is configured to utilize a first band for a first transmission (or reception) of a first PPDU and, independently from the first transmission or reception, utilize a second band for a second transmission (reception) of a second PPDU, where the first and second PPDUs have different start times, different end times, or both different start and end times. In some embodiments and/or scenarios, the first PPDU and the second PPDU have a same source address (e.g., transmitted by the AP 114). In some embodiments and/or scenarios, the first PPDU and the second PPDU have a same destination address (e.g., transmitted to the AP 114). In some embodiments and/or scenarios, a source address of the first PPDU and a destination address of the second PPDU have a same address (e.g., the AP 114 transmits the first PPDU and receives the second PPDU). In some embodiments and/or scenarios, a destination address of the first PPDU and a source address of the second PPDU have a same address (e.g., the AP 114 receives the first PPDU and transmits the second PPDU). In some embodiments, the AP 114 utilizes separate medium access procedures for the two or more bands. In an embodiment, the AP 114 utilizes same association procedures (e.g., block acknowledgment negotiation, key negotiation, target wake time negotiation) across the bands, but utilizes the different medium access procedures across the bands.

Figure 7:
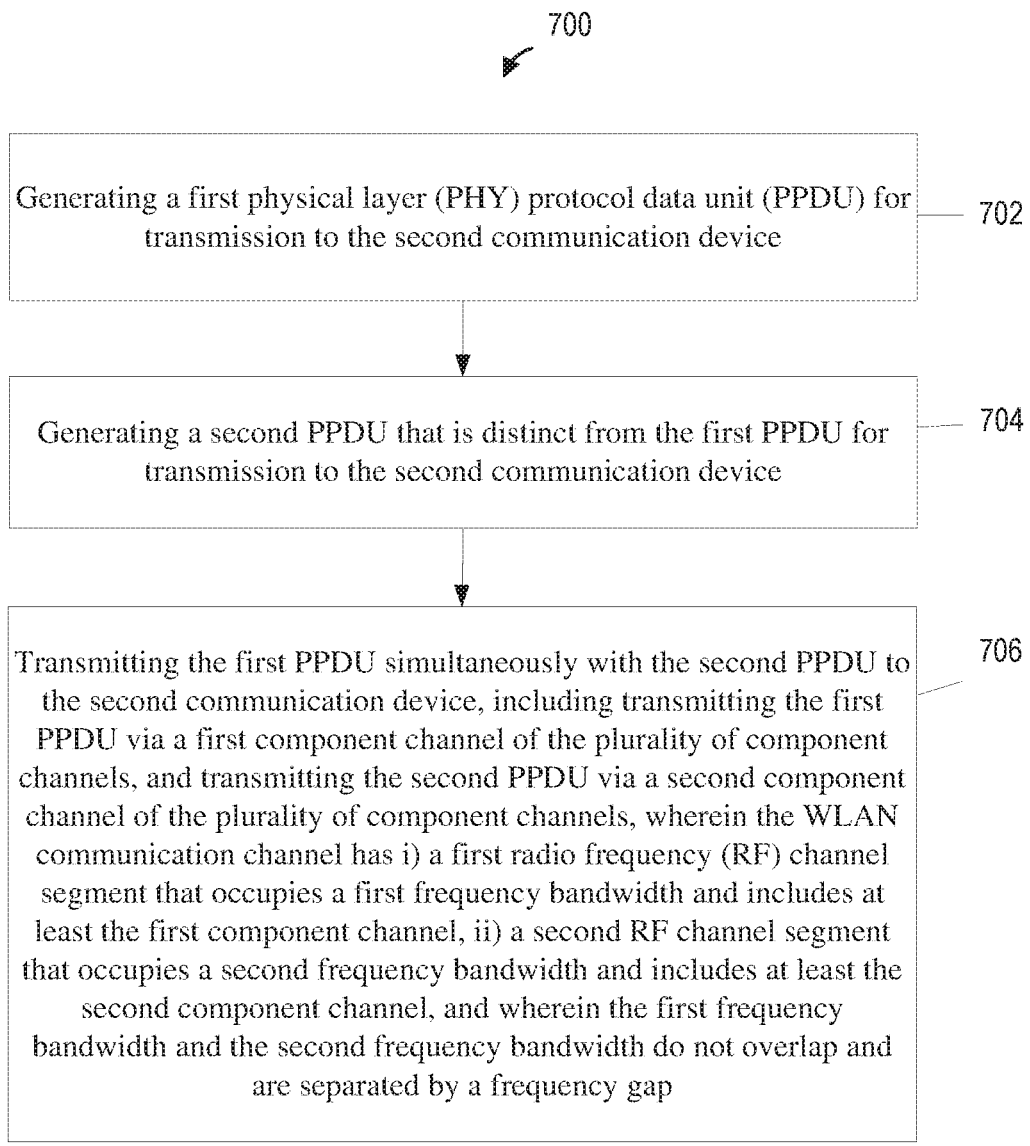
FIG. 7 is a flow diagram illustrating an example method for operation of a first WLAN communication device of FIG. 1 in a WLAN communication channel between the first WLAN communication device and a second WLAN communication device of FIG. 1, in an embodiment.

FIG. 7 is a flow diagram illustrating an example method 700 for operation of a first communication device in a WLAN communication channel between the first communication device and a second communication device, in an embodiment. The WLAN communication channel includes a plurality of component channels, for example, component channels as described above and shown in FIGS. 4, 5A, and 5B. In an embodiment, the method 700 is implemented by a client station in the WLAN, according to an embodiment. With reference to FIG. 1, the method 700 is implemented by the network interface 162, in an embodiment. For example, in one such embodiment, the PHY processor 170 is configured to implement the method 700. According to another embodiment, the MAC processor 166 is also configured to implement at least a part of the method 700. With continued reference to FIG. 1, in yet another embodiment, the method 700 is implemented by the network interface 122 (e.g., the PHY processor 130 and/or the MAC processor 126). In other embodiments, the method 700 is implemented by other suitable network interfaces.

At block 702, a first physical layer (PHY) protocol data unit (PPDU) is generated for transmission to the second communication device.

At block 704, a second PPDU that is distinct from the first PPDU is generated for transmission to the second communication device. In an embodiment, the first PPDU is similar to the PPDU 590-1 (described above) and the second PPDU is similar to the PPDU 590-2 (described above). In some embodiments, the second PPDU is generated to have a same start time, a same end time, and a same PHY header length as the first PPDU. In some scenarios, the same start time, end time, and PHY header length simplify reception and decoding of the first and second PPDUs by a receiver.

At block 706, the first PPDU is transmitted simultaneously with the second PPDU to the second communication device over the WLAN communication channel. Block 706 includes transmitting the first PPDU via a first component channel of the plurality of component channels, the first component channel being within a first radio frequency (RF) channel segment that occupies a first frequency bandwidth, and transmitting the second PPDU via a second component channel of the plurality of component channels, the second component channel being within a second RF channel segment that occupies a second frequency bandwidth that does not overlap the first frequency bandwidth segment, and is separated from the first frequency bandwidth segment by a frequency gap.

In some embodiments, block 706 also includes determining, at the first communication device, whether i) the first component channel is available for transmission of the first PPDU using a first medium access procedure, and ii) the second component channel is available for transmission of the second PPDU using a second medium access procedure that is different from the first medium access procedure. In some scenarios, the AP 114 utilizes different medium access procedures to improve coexistence and sharing of at least some of the bands with legacy devices or single-band devices, for example, by using a longer backoff timer in a first band that is used by single-band devices that are unable to utilize a second band. In an embodiment, block 706 also includes utilizing a same association procedure for each component channel of the plurality of component channels, wherein the association procedure is one of a block acknowledgment negotiation, key negotiation, and target wake time negotiation. In other words, the AP 114 utilizes a different medium access procedure for the different bands, but a same association procedure for the different bands.

In some embodiments, the method 700 further includes setting, at the first communication device, at least some PHY parameters that correspond to the first component channel and at least some PHY parameters that correspond to the second component channel to same respective values. In an embodiment, the PHY parameters include at least one of a modulation and coding scheme (MCS) and a number of spatial streams (NSS). In an embodiment, the method 700 further includes setting, at the first communication device, at least some PHY parameters that correspond to a third component channel of the plurality of component channels to values different from the first and second component channels. In an embodiment, for example, the AP 114 supports a 2.4 GHz band, a 5 GHz band, and a 6 GHz band and sets some PHY parameters (e.g., MCS and NSS) to same values (e.g., NSS=8 and MCS index=10) for the 5 GHz band and 6 GHz band and sets the PHY parameters to different values for the 2.4 GHz band (e.g., NSS=1 and MCS index=3). In some scenarios, the AP 114 sets the PHY parameters to different values to support legacy devices that may be more likely to use a particular band (e.g., the 2.4 GHz band).

In an embodiment, the method 700 further includes assigning, by the first communication device, i) a first basic service set (BSS) color to the first RF channel segment, and ii) a second BSS color to the second RF channel segment. In an embodiment, the method 700 further includes assigning, by the first communication device, i) a first association identifier (AID) to the second communication device in the first RF channel segment, and ii) a second AID to the second communication device in the second RF channel segment, wherein the first AID is different from the second AID. In some scenarios, different BSS colors and AIDs across different bands improve efficiency of the band utilization, for example, by providing an indication of the band on which a PPDU has been received to an upper layer of the MAC processor so that an acknowledgment to the PPDU can be transmitted on the same band.

In an embodiment, the method 700 includes generating a plurality of MPDUs and generating the first PPDU and the second PPDU so that respective ones of the plurality of MPDUs are included in only one of the first PPDU and the second PPDU. In some scenarios, an MPDU that is included in only one of the PPDUs (e.g., the first PPDU in the first band) is more easily decoded by a receiver because only one PHY processor associated with the first band is used to decode the first PPDU. In an embodiment, the plurality of MPDUs includes MPDUs having a first traffic identifier (TID) and MPDUs having a second TID that is different from the first TID.

In some embodiments, generating the first PPDU includes generating respective non-legacy PHY signal fields of the first PPDU that indicate each of the component channels within the first RF channel segment in which the first PPDU is to be transmitted, and generating the second PPDU includes generating respective non-legacy PHY signal fields of the second PPDU that indicate each of the component channels within the second RF channel segment in which the second PPDU is to be transmitted. In some scenarios, providing the indication of the component channels within the corresponding non-legacy PHY signal field simplifies decoding of the PPDU when the PPDUs are received by different PHY processors of a same receiving device.

Figure 8:
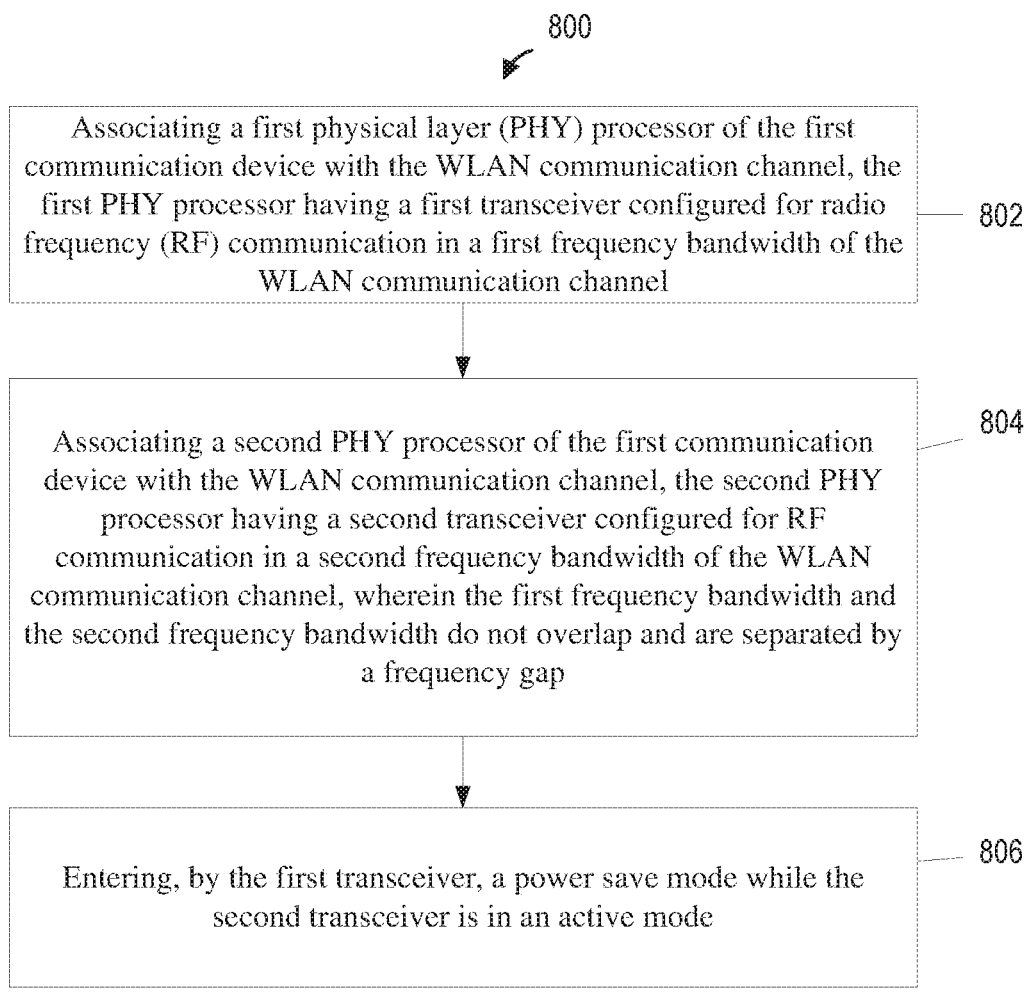
FIG. 8 is a flow diagram illustrating an example method for operation of a first WLAN communication device of FIG. 1 in a WLAN communication channel between the first WLAN communication device and a second WLAN communication device, according to an embodiment.

FIG. 8 is a flow diagram illustrating an example method 800 for operation of a first communication device in a WLAN communication channel between the first communication device and a second communication device, according to an embodiment. The WLAN communication channel includes a plurality of component channels, for example, component channels as described above and shown in FIGS. 4, 5A, and 5B. In an embodiment, the method 800 is implemented by a client station in the WLAN, according to an embodiment. With reference to FIG. 1, the method 800 is implemented by the network interface 162, in an embodiment. For example, in one such embodiment, the PHY processor 170 is configured to implement the method 800. According to another embodiment, the MAC processor 166 is also configured to implement at least a part of the method 800. With continued reference to FIG. 1, in yet another embodiment, the method 800 is implemented by the network interface 122 (e.g., the PHY processor 130 and/or the MAC processor 126). In other embodiments, the method 800 is implemented by other suitable network interfaces.

At block 802, a first physical layer (PHY) processor of the first communication device is associated with the WLAN communication channel, in an embodiment. The first PHY processor has a first transceiver configured for radio frequency (RF) communication in a first frequency bandwidth of the WLAN communication channel. In an embodiment, the first PHY processor generally corresponds to the PHY processor 316.

At block 804, a second PHY processor of the first communication device is associated with the WLAN communication channel, in an embodiment. The second PHY processor has a second transceiver configured for RF communication in a second frequency bandwidth of the WLAN communication channel, wherein the first frequency bandwidth and the second frequency bandwidth do not overlap and are separated by a frequency gap. In an embodiment, the second PHY processor generally corresponds to the PHY processor 320.

At block 806, the first transceiver enters a power save mode while the second transceiver is in an active mode, in an embodiment. In an embodiment, the method 800 also includes receiving, at the first PHY processor and from the second communication device, a first PPDU that indicates a first request by the second communication device for the first transceiver to enter the power save mode, and entering the power save mode includes entering the power saver mode in response to the first request.

In some embodiments, the method 800 further includes generating a first PHY protocol data unit (PPDU) that indicates entry into the power save mode by the first transceiver, and transmitting the first PPDU to the second communication device to announce the entry into the power save mode to the second communication device.

In some embodiments, the method 800 also includes receiving, at the second PHY processor, a second PPDU that indicates a second request by the second communication device for the first transceiver to enter the active mode, and entering, by the first transceiver, the active mode in response to the second request. In an embodiment, the first request and the second request are indicated by one of an information element, an extremely high throughput (EHT) variant high throughput (HT) control field, and a high efficiency (HE) variant HT control field.

In some embodiments, the method 800 also includes receiving, at the first PHY processor, a second PPDU that indicates a second request by the second communication device for the first transceiver to enter the active mode, and entering, by the first transceiver, the active mode in response to the second request. The power save mode includes i) a wake state during which the first PHY processor listens for the second request, and ii) a doze state during which the first PHY processor does not listen for signals via the first transceiver.

Further aspects of the present invention relate to one or more of the following clauses.

In an embodiment, a method for operation of a first communication device in a wireless local area network (WLAN) communication channel between the first communication device and a second communication device comprises, where the WLAN communication channel has a plurality of component channels: generating, at the first communication device, a first physical layer (PHY) protocol data unit (PPDU) for transmission to the second communication device; generating, at the first communication device, a second PPDU that is distinct from the first PPDU for transmission to the second communication device; transmitting, by the first communication device, the first PPDU simultaneously with the second PPDU to the second communication device over the WLAN communication channel, the transmitting including: transmitting the first PPDU via a first component channel of the plurality of component channels, the first component channel being within a first radio frequency (RF) channel segment that occupies a first frequency bandwidth, and transmitting the second PPDU via a second component channel of the plurality of component channels, the second component channel being within a second RF channel segment that occupies a second frequency bandwidth that does not overlap the first frequency bandwidth segment, and is separated from the first frequency bandwidth segment by a frequency gap.

In other embodiments, the method includes any suitable combination of one or more of the following features.

The method further includes: setting, at the first communication device, at least some PHY parameters that correspond to the first component channel and at least some PHY parameters that correspond to the second component channel to same respective values.

The at least some PHY parameters include at least one of a modulation and coding scheme (MCS) and a number of spatial streams (NSS).

The method further includes: setting, at the first communication device, at least some PHY parameters that correspond to a third component channel of the plurality of component channels to values different from the first and second component channels.

The method further includes: transmitting the first PPDU via the first component channel of the plurality of component channels comprises transmitting the first PPDU within a 5 GHz channel segment, and transmitting the second PPDU via the second component channel of the plurality of component channels comprises transmitting the second PPDU within one of a 6 GHz channel segment and a 2.4 GHz channel segment.

Generating the second PPDU includes generating the second PPDU to have a same start time, a same end time, and a same PHY header length as the first PPDU.

Transmitting the first PPDU simultaneously with the second PPDU to the second communication device includes: determining, at the first communication device, whether i) the first component channel is available for transmission of the first PPDU using a first medium access procedure, and ii) the second component channel is available for transmission of the second PPDU using a second medium access procedure that is different from the first medium access procedure.

The method further includes: utilizing, at the first communication device, a same association procedure for each component channel of the plurality of component channels, wherein the association procedure is one of a block acknowledgment negotiation, key negotiation, and target wake time negotiation.

The method further includes: assigning, by the first communication device, i) a first basic service set (BSS) color to the first RF channel segment, and ii) a second BSS color to the second RF channel segment.

The method further includes: assigning, by the first communication device, i) a first association identifier (AID) to the second communication device in the first RF channel segment, and ii) a second AID to the second communication device in the second RF channel segment, wherein the first AID is different from the second AID.

The method further includes: generating a plurality of medium access control protocol data units (MPDUs); generating the first PPDU and the second PPDU so that respective ones of the plurality of MPDUs are included in only one of the first PPDU and the second PPDU.

Generating the plurality of MPDUs includes generating MPDUs having a first traffic identifier (TID) and MPDUs having a second TID that is different from the first TID.

Generating the first PPDU includes generating respective non-legacy PHY signal fields of the first PPDU that indicate each of the component channels within the first RF channel segment in which the first PPDU is to be transmitted; and generating the second PPDU includes generating respective non-legacy PHY signal fields of the second PPDU that indicate each of the component channels within the second RF channel segment in which the second PPDU is to be transmitted.

In an embodiment, a first communication device configured for operation in a wireless local area network (WLAN) communication channel between the first communication device and a second communication device includes a network interface device having one or more integrated circuits. The WLAN communication channel has a plurality of component channels. The one or more integrated circuits are configured to generate, at the first communication device, a first physical layer (PHY) protocol data unit (PPDU) for transmission to the second communication device; generate, at the first communication device, a second PPDU that is distinct from the first PPDU for transmission to the second communication device; transmit, by the first communication device, the first PPDU simultaneously with the second PPDU to the second communication device over the WLAN communication channel, the transmitting including: transmitting the first PPDU via a first component channel of the plurality of component channels, the first component channel being within a first radio frequency (RF) channel segment that occupies a first frequency bandwidth, and transmitting the second PPDU via a second component channel of the plurality of component channels, the second component channel being within a second RF channel segment that occupies a second frequency bandwidth that does not overlap the first frequency bandwidth segment, and is separated from the first frequency bandwidth segment by a frequency gap.

In other embodiments, the first communication device includes any suitable combination of one or more of the following features.

The one or more integrated circuits are configured to set, at the first communication device, at least some PHY parameters that correspond to the first component channel and at least some PHY parameters that correspond to the second component channel to same respective values.

The at least some PHY parameters include at least one of a modulation and coding scheme (MCS) and a number of spatial streams (NSS).

The one or more integrated circuits are configured to set, at the first communication device, at least some PHY parameters that correspond to a third component channel of the plurality of component channels to values different from the first and second component channels.

The one or more integrated circuits are configured to transmit the first PPDU via the first component channel of the plurality of component channels comprises transmitting the first PPDU within a 5 GHz channel segment, and transmit the second PPDU via the second component channel of the plurality of component channels comprises transmitting the second PPDU within one of a 6 GHz channel segment and a 2.4 GHz channel segment.

The one or more integrated circuits are configured to generate the second PPDU comprises generating the second PPDU to have a same start time, a same end time, and a same PHY header length as the first PPDU.

The one or more integrated circuits are configured to determine, at the first communication device, whether i) the first component channel is available for transmission of the first PPDU using a first medium access procedure, and ii) the second component channel is available for transmission of the second PPDU using a second medium access procedure that is different from the first medium access procedure.

The one or more integrated circuits are configured to utilize, at the first communication device, a same association procedure for each component channel of the plurality of component channels, wherein the association procedure is one of a block acknowledgment negotiation, key negotiation, and target wake time negotiation.

The one or more integrated circuits are configured to assign, by the first communication device, i) a first basic service set (BSS) color to the first RF channel segment, and ii) a second BSS color to the second RF channel segment.

The one or more integrated circuits are configured to assign, by the first communication device, i) a first association identifier (AID) to the second communication device in the first RF channel segment, and ii) a second AID to the second communication device in the second RF channel segment, wherein the first AID is different from the second AID.

The one or more integrated circuits are configured to generate a plurality of medium access control protocol data units (MPDUs); generate the first PPDU and the second PPDU so that respective ones of the plurality of MPDUs are included in only one of the first PPDU and the second PPDU.

The one or more integrated circuits are configured to generate the plurality of MPDUs includes generating MPDUs having a first traffic identifier (TID) and MPDUs having a second TID that is different from the first TID.

The one or more integrated circuits are configured to generate respective non-legacy PHY signal fields of the first PPDU that indicate each of the component channels within the first RF channel segment in which the first PPDU is to be transmitted, and generate respective non-legacy PHY signal fields of the second PPDU that indicate each of the component channels within the second RF channel segment in which the second PPDU is to be transmitted.

In an embodiment, a method for operation of a first communication device in a wireless local area network (WLAN) communication channel between the first communication device and a second communication device includes, where the WLAN communication channel having a plurality of component channels: associating, by the first communication device, a first physical layer (PHY) processor of the first communication device with the WLAN communication channel, the first PHY processor having a first transceiver configured for radio frequency (RF) communication in a first frequency bandwidth of the WLAN communication channel; associating, by the first communication device, a second PHY processor of the first communication device with the WLAN communication channel, the second PHY processor having a second transceiver configured for RF communication in a second frequency bandwidth of the WLAN communication channel, wherein the first frequency bandwidth and the second frequency bandwidth do not overlap and are separated by a frequency gap; and entering, by the first transceiver, a power save mode while the second transceiver is in an active mode.

In other embodiments, the method includes any suitable combination of one or more of the following features.

The method further includes: generating, by the first PHY processor, a first PHY protocol data unit (PPDU) that indicates entry into the power save mode by the first transceiver; and transmitting, by the first PHY processor, the first PPDU to the second communication device to announce the entry into the power save mode to the second communication device.

The method further includes receiving, at the first PHY processor and from the second communication device, a first PPDU that indicates a first request by the second communication device for the first transceiver to enter the power save mode; wherein entering the power save mode comprises entering the power saver mode in response to the first request.

The method further includes receiving, at the second PHY processor, a second PPDU that indicates a second request by the second communication device for the first transceiver to enter the active mode; entering, by the first transceiver, the active mode in response to the second request.

The first request and the second request are indicated by one of an information element, an extremely high throughput (EHT) variant high throughput (HT) control field, and a high efficiency (HE) variant HT control field.

The method further includes receiving, at the first PHY processor, a second PPDU that indicates a second request by the second communication device for the first transceiver to enter the active mode; entering, by the first transceiver, the active mode in response to the second request.

The power save mode includes i) a wake state during which the first PHY processor listens for the second request, and ii) a doze state during which the first PHY processor does not listen for signals via the first transceiver.

In another embodiment, a first communication device configured for operation in a wireless local area network (WLAN) communication channel between the first communication device and a second communication device includes a network interface device having one or more integrated circuits. The WLAN communication channel has a plurality of component channels. The one or more integrated circuits are configured to: associate a first physical layer (PHY) processor of the first communication device with the WLAN communication channel, the first PHY processor having a first transceiver configured for radio frequency (RF) communication in a first frequency bandwidth of the WLAN communication channel; associate a second PHY processor of the first communication device with the WLAN communication channel, the second PHY processor having a second transceiver configured for RF communication in a second frequency bandwidth of the WLAN communication channel, wherein the first frequency bandwidth and the second frequency bandwidth do not overlap and are separated by a frequency gap; and enter a power save mode while the second transceiver is in an active mode.

In other embodiments, the first communication device includes any suitable combination of one or more of the following features.

The one or more integrated circuits are configured to: generate, by the first PHY processor, a first PHY protocol data unit (PPDU) that indicates entry into the power save mode by the first transceiver; and transmit, by the first PHY processor, the first PPDU to the second communication device to announce the entry into the power save mode to the second communication device.

The one or more integrated circuits are configured to receive, at the first PHY processor and from the second communication device, a first PPDU that indicates a first request by the second communication device for the first transceiver to enter the power save mode; wherein entering the power save mode comprises entering the power saver mode in response to the first request.

The one or more integrated circuits are configured to receive, at the second PHY processor, a second PPDU that indicates a second request by the second communication device for the first transceiver to enter the active mode; and enter, by the first transceiver, the active mode in response to the second request.

The first request and the second request are indicated by one of an information element, an extremely high throughput (EHT) variant high throughput (HT) control field, and a high efficiency (HE) variant HT control field.

The one or more integrated circuits are configured to receive, at the first PHY processor, a second PPDU that indicates a second request by the second communication device for the first transceiver to enter the active mode; entering, by the first transceiver, the active mode in response to the second request.

The power save mode includes i) a wake state during which the first PHY processor listens for the second request, and ii) a doze state during which the first PHY processor does not listen for signals via the first transceiver.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for operation of an access point (AP) in a wireless local area network (WLAN), the method comprising:
    generating, at the AP, one or more medium access control (MAC) protocol data units (MPDUs), for transmission to one or more client stations, the one or more client stations including a first client station;
    generating, at the AP, a first physical layer (PHY) protocol data unit (PPDU) to include the one or more MPDUs;
    transmitting, by the AP, the first PPDU to the one or more client stations via a first frequency channel segment of the WLAN; and
    receiving, at the AP, a second PPDU via a second frequency channel segment while transmitting the first PPDU via the first channel segment, the second PPDU including one of i) a channel availability report from the first client station, ii) a buffer status report from the first client station, and iii) sounding feedback from the first client station.

2. The method for operation of the AP of claim 1, further comprising:
    generating, at the AP, a trigger frame configured to prompt the first client station to transmit the second PPDU having the one of the i) the channel availability report from the first client station, ii) the buffer status report from the first client station, and iii) the sounding feedback from the first client station;
    generating, at the AP, a third PPDU to include the trigger frame; and
    transmitting, by the AP, the third PPDU via the second frequency channel segment to prompt the client station to transmit the second PPDU.

3. The method for operation of the AP of claim 2, further comprising:
    performing, at the AP, a first backoff procedure for the first frequency channel segment prior to transmitting the first PPDU via the first frequency channel segment; and
    performing, at the AP, a second backoff procedure for the second frequency channel segment prior to transmitting the third PPDU via the second frequency channel segment.

4. The method for operation of the AP of claim 2, further comprising:
    performing, at the AP, a first backoff procedure for the first frequency channel segment prior to transmitting the first PPDU via the first frequency channel segment; and
    checking, at the AP, that the second frequency channel segment is idle for a predetermined time period prior to transmitting the third PPDU via the second frequency channel segment.

5. The method for operation of the AP of claim 2, wherein transmitting the third PPDU comprises:
    transmitting the third PPDU via the second frequency channel segment while transmitting the first PPDU via the first channel segment.

6. The method for operation of the AP of claim 1, wherein:
    the second frequency channel segment is separated in frequency from the first frequency channel segment by a frequency gap.

7. The method for operation of the AP of claim 1, wherein:
    the first frequency channel segment is within one of i) a 5 GHz radio frequency (RF) band, and ii) a 6 GHz RF band; and
    the second frequency channel segment is within another one of i) the 5 GHz RF band, and ii) the 6 GHz RF band.

8. An access point (AP) for use in a wireless local area network (WLAN), the AP comprising:
    a wireless network interface comprising one or more integrated circuits (ICs) configured to:
        generate one or more medium access control (MAC) protocol data units (MPDUs), for transmission to one or more client stations, the one or more client stations including a first client station,
        generate a first physical layer (PHY) protocol data unit (PPDU) to include the one or more MPDUs,
        control the wireless network interface to transmit the first PPDU to the one or more client stations via a first frequency channel segment of the WLAN, and
        receive one of i) a channel availability report from the first client station, ii) a buffer status report from the first client station, and iii) sounding feedback from the first client station, included within a second PPDU that was received from the first client station by the wireless network interface via a second frequency channel segment while transmitting the first PPDU via the first channel segment.

9. The AP of claim 8, wherein the one or more ICs are further configured to:
    generate a trigger frame configured to prompt the first client station to transmit the second PPDU having the one of the i) the channel availability report from the first client station, ii) the buffer status report from the first client station, and iii) the sounding feedback from the first client station;
    generate a third PPDU to include the trigger frame; and
    control the wireless network interface to transmit the third PPDU via the second frequency channel segment to prompt the client station to transmit the second PPDU.

10. The AP of claim 9, wherein the one or more ICs are further configured to:
    perform a first backoff procedure for the first frequency channel segment prior to transmitting the first PPDU via the first frequency channel segment; and perform a second backoff procedure for the second frequency channel segment prior to transmitting the third PPDU via the second frequency channel segment.

11. The AP of claim 9, wherein the one or more ICs are further configured to:
perform a first backoff procedure for the first frequency channel segment prior to transmitting the first PPDU via the first frequency channel segment; and
check that the second frequency channel segment is idle for a predetermined time period prior to transmitting the third PPDU via the second frequency channel segment.

12. The AP of claim 9, wherein the one or more ICs are configured to:
control the wireless network interface to transmit the third PPDU via the second frequency channel segment while transmitting the first PPDU via the first channel segment.

13. The AP of claim 8, wherein:
the second frequency channel segment is separated in frequency from the first frequency channel segment by a frequency gap.

14. The AP of claim 8, wherein:
the first frequency channel segment is within one of i) a 5 GHz radio frequency (RF) band, and ii) a 6 GHz RF band; and
the second frequency channel segment is within another one of i) the 5 GHz RF band, and ii) the 6 GHz RF band.

15. A method for operation of a client station in a wireless local area network (WLAN), the method comprising:
receiving, at the client, a first physical layer (PHY) protocol data unit (PPDU) from an access point (AP) via a first frequency channel segment of the WLAN, the first PPDU including one or more medium access control (MAC) protocol data units (MPDUs) from the AP;
generating, at the client station, one of i) a channel availability report, ii) a buffer status report, and iii) sounding feedback;
generating, at the client station, a second PPDU to include the one of the i) the channel availability report, ii) the buffer status report, and iii) the sounding feedback; and
transmitting, by the client station, the second PPDU to the AP via a second frequency channel segment of the WLAN while receiving the first PPDU via the first frequency segment of the WLAN.

16. The method for operation of the client station of claim 15, further comprising:
receiving, at the client station, a third PPDU from the AP via the second frequency channel segment, the third PPDU having a trigger frame configured to prompt the client station to transmit the second PPDU having the one of the i) the channel availability report, ii) the buffer status report, and iii) the sounding feedback;
wherein transmitting the second PPDU is in response to receiving the trigger frame via the second frequency channel segment.

17. The method for operation of the client station of claim 16, wherein receiving the third PPDU comprises:
receiving the third PPDU via the second frequency channel segment while receiving the first PPDU via the first channel segment.

18. The method for operation of the client station of claim 15, further comprising:
performing, at the client station, a backoff procedure for the second frequency channel segment prior to transmitting the second PPDU via the second frequency channel segment.

19. The method for operation of the client station of claim 15, further comprising:
checking, at the client station, that the second frequency channel segment is idle for a predetermined time period prior to transmitting the second PPDU via the second frequency channel segment.

20. The method for operation of the client station of claim 15, wherein:
the second frequency channel segment is separated in frequency from the first frequency channel segment by a frequency gap.

21. The method for operation of the client station of claim 15, wherein:
the first frequency channel segment is within one of i) a 5 GHz radio frequency (RF) band, and ii) a 6 GHz RF band; and
the second frequency channel segment is within another one of i) the 5 GHz RF band, and ii) the 6 GHz RF band.

22. A client station for use in a wireless local area network (WLAN), the client station comprising:
a wireless network interface comprising one or more integrated circuits (ICs) configured to:
receive a first physical layer (PHY) protocol data unit (PPDU) having one or more medium access control (MAC) protocol data units (MPDUs), the first PPDY received by the wireless network interface from an access point (AP) via a first frequency channel segment of the WLAN,
generate one of i) a channel availability report, ii) a buffer status report, and iii) sounding feedback,
generate a second PPDU to include the one of the i) the channel availability report, ii) the buffer status report, and iii) the sounding feedback, and
control the wireless network interface to transmit the second PPDU to the AP via a second frequency channel segment of the WLAN while receiving the first PPDU via the first frequency segment of the WLAN.

23. The client station of claim 22, wherein the one or more ICs are further configured to:
receive a third PPDU having a trigger frame configured to prompt the client station to transmit the second PPDU having the one of the i) the channel availability report, ii) the buffer status report, and iii) the sounding feedback, the third PPDU received by the wireless network interface from the AP via the second frequency channel segment;
wherein transmitting the second PPDU is in response to receiving the trigger frame via the second frequency channel segment.

24. The client station of claim 23, wherein the wireless network interface is configured to:
receive the third PPDU via the second frequency channel segment while receiving the first PPDU via the first channel segment.

25. The client station of claim 22, wherein the one or more ICs are further configured to:
perform a backoff procedure for the second frequency channel segment prior to transmitting the second PPDU via the second frequency channel segment.

26. The client station of claim 22, wherein the one or more ICs are further configured to:

check that the second frequency channel segment is idle for a predetermined time period prior to transmitting the second PPDU via the second frequency channel segment.

27. The client station of claim 22, wherein:

the second frequency channel segment is separated in frequency from the first frequency channel segment by a frequency gap.

28. The client station of claim 22, wherein:

the first frequency channel segment is within one of i) a 5 GHz radio frequency (RF) band, and ii) a 6 GHz RF band; and the second frequency channel segment is within another one of i) the 5 GHz RF band, and ii) the 6 GHz RF band.

* * * * *